INVENTORS
WILLIAM L. POLHEMUS
LEWIS M. BOSTICK

Nov. 5, 1963 W. L. POLHEMUS ETAL 3,109,588
CELESTIAL COMPUTERS
Filed Jan. 26, 1962 21 Sheets-Sheet 7

INVENTORS
WILLIAM L. POLHEMUS
LEWIS M. BOSTICK
BY

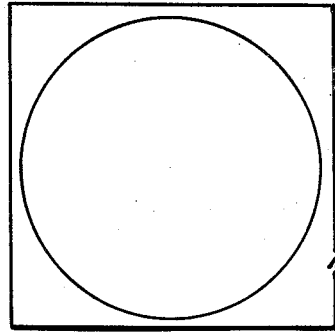

D.R.
TRACK 060°
GS 500 KT
LAT. 36°N
LONG 97°W
CORIOUS 7.7
REC. & NU 2/120°

TABULATED AZIMUTH

| Zn | 290 | 170 | 040 | ✓ |
|---|---|---|---|---|
| Zn-Tr | +50 | +70 | -20 | |
| MOT BODY | +11.5' | -2.1' | -7.8' | |
| MOT OBS | +5.2' | +2.8' | -7.9' | |
| TOTAL CORR (MIN) | +16.7' | +.7 | -15.7 | |
| X TIME DIFF | x+5' | x+2' | x-1' | |
| TOTAL ADJ | +83.5 | +1.4 | +15.7 | |

| | START | | | |
|---|---|---|---|---|
| HDG | END | | | |
| | HDG CHGE | | | |
| X RANGE FACTOR | 10 | 12.5 | 4.3 | |
| CORR FOR WANDER | | | | |
| TAS | START END | | | |
| | TAS | | | |
| | CHGE | | | |
| X TAS FACTOR | 9.6 | 5.0 | 14.0 | |
| CORR FOR TAS CHGE | | | | |

Fig 9.

| DATE | | | FIX TIME 1000 | |
|---|---|---|---|---|
| PLANNED SHOT TIME | 0952 | 0956 | 1000 | |
| BODY | POLLUX | ANTARES | DUBHE | |
| GHAT | | | 152°00' | |
| CORR | | | | |
| SHA | | | | |
| GHA* | | | 152°00' | |
| ASSUM LONG | | | 97°00' | |
| LHA ϒ | | | 55°00' | |
| ASSUM LAT | | | 36°00' | |
| DEC | | | — | |

| ACTUAL TIME OF SHOT | 0955 | 0958 | 1001 | |
|---|---|---|---|---|
| COORDINATES PRES. POSIT. | | LAT. LONG | 35°42'N 96°20'W | |
| Ha | 37°20' | 20°15' | 40°15' | |
| TOTAL ADJ | +1°23.5' | +0°01.5' | +15.7' | |
| TOTAL CORR | — | — | — | |
| CALCULATED Hc | 38°43.5 | 20°16.5 | 40°30.7 | |
| SEXTANT Ho | 38°40 | 20°30' | 40°50' | |
| Int. | -3.5A | +14.5T | +19.3T | |
| Zn | 290° | 170° | 040° | |

Q of POLARIS   +50'

INVENTORS
WILLIAM L. POLHEMUS
LOUIS M. BOSTICK
BY

INVENTORS
WILLIAM L. POLHEMUS
LEWIS M. BOSTICK
BY

Nov. 5, 1963 W. L. POLHEMUS ETAL 3,109,588
CELESTIAL COMPUTERS
Filed Jan. 26, 1962 21 Sheets-Sheet 20

INVENTORS.
WILLIAM L. POLHEMUS
LEWIS M. BOSTICK
BY

Nov. 5, 1963

W. L. POLHEMUS ETAL 3,109,588

CELESTIAL COMPUTERS

Filed Jan. 26, 1962

INVENTORS
WILLIAM L. POLHEMUS
LEWIS M. BOSTICK
BY

United States Patent Office 3,109,588
Patented Nov. 5, 1963

3,109,588
CELESTIAL COMPUTERS
William L. Polhemus, 7012 Treehaven, and Lewis M. Bostick, 112 Key Lane, both of Fort Worth, Tex.
Filed Jan. 26, 1962, Ser. No. 168,908
5 Claims. (Cl. 235—88)

This invention relates to celestial computers, and more particularly to such computers of the hand-held type for use by aircraft navigators.

An object of the present invention is to provide a complete hand-held computer and plotter device for use by aircraft navigators, which provides all of the corrections required in the solution of a celestial navigation problem to include determination of star apparent motion due to earth rotation, aircraft induced apparent motion, coriolis acceleration correction, sextant relative bearing, information about the star Polaris, and corrections for acceleration experienced in the lateral and longitudinal axes of the aircraft, in cooperation with an included plotter which translates the celestial information into geographic coordinate information and aircraft steering data.

A further object is the provision of a simple and compact computer of the multiple disk type which requires a minimum number of settings to produce the required navigational data to provide a vector solution simultaneously of a plurality of celestial bodies.

A further object is the provision of a compact easily operated celestial computer which requires only three manual settings to produce the required data, including an adjustable plotting surface which eliminates the need of draftsman's dividers and special protractors in solving the celestial solution and in determining the course and distance to fly.

A still further object is the provision of a computer in which the answers can be read out as precise arithmetic values which are accurate to two tenths of a mile increments and can be interpolated by the operator to one tenth mile or less increments.

A further object is the provision of a hand-held multiple disk type computer which is accurate for aircraft speed from zero to two thousand knots.

A further object is the provision of a small, hand-held, disk type computer for celestial navigation which brings together in one location, correction to apply to a navigational plural star fix for motion of a star, or stars; correction to apply to a navigational fix for the motion of the aircraft; correction to apply to a navigational fix for rotation of the earth (more commonly referred to as Coriolis corrections); present correction to apply to the observed altitude of the star Polaris for the condition of its not being exactly above the North Pole of the earth; corrects the value of true azimuth of the star Polaris for variations in observers latitude; presents the value of sextant relative azimuth to facilitate the location of the stars when using certain conventional types of sextants; presents the correction factors for determining true altitude of the observed celestial body when the observation has been disturbed by aircraft acceleration in heading and velocity (commonly referred to as wander error and true air speed change correction).

A further object is the provision of computer having a rotatably adjustable plotting side or disk having a true map projection in the form of a transparent overlay which is comparable to that used in overwater navigational chart to provide the navigator or operator to plot the navigational fix utilizing the advantages of a plotting board, but presenting the solution in true coordinates, and providing an azimuth scale at the top of the plotter means to determine direction to destination or track made good between fixes.

A further object is the provision of two azimuth scales on the cooperating plotter portion of the device for determining the distance between computed star altitude and measured star altitude.

A further object includes a distance determining disk having a grid surface cooperating with the plotter means for accurately determining distance covered between fixes.

Other objects and advantages of the invention will become apparent from the following description and accompanying drawings in which like reference characters refer to like parts in the several figures.

FIGURE 9 is a conventional celestial navigation form, filled out to determine the solution of a three star fix, later used herein to explain the operation of the computer and plotter device;

Figure 16:
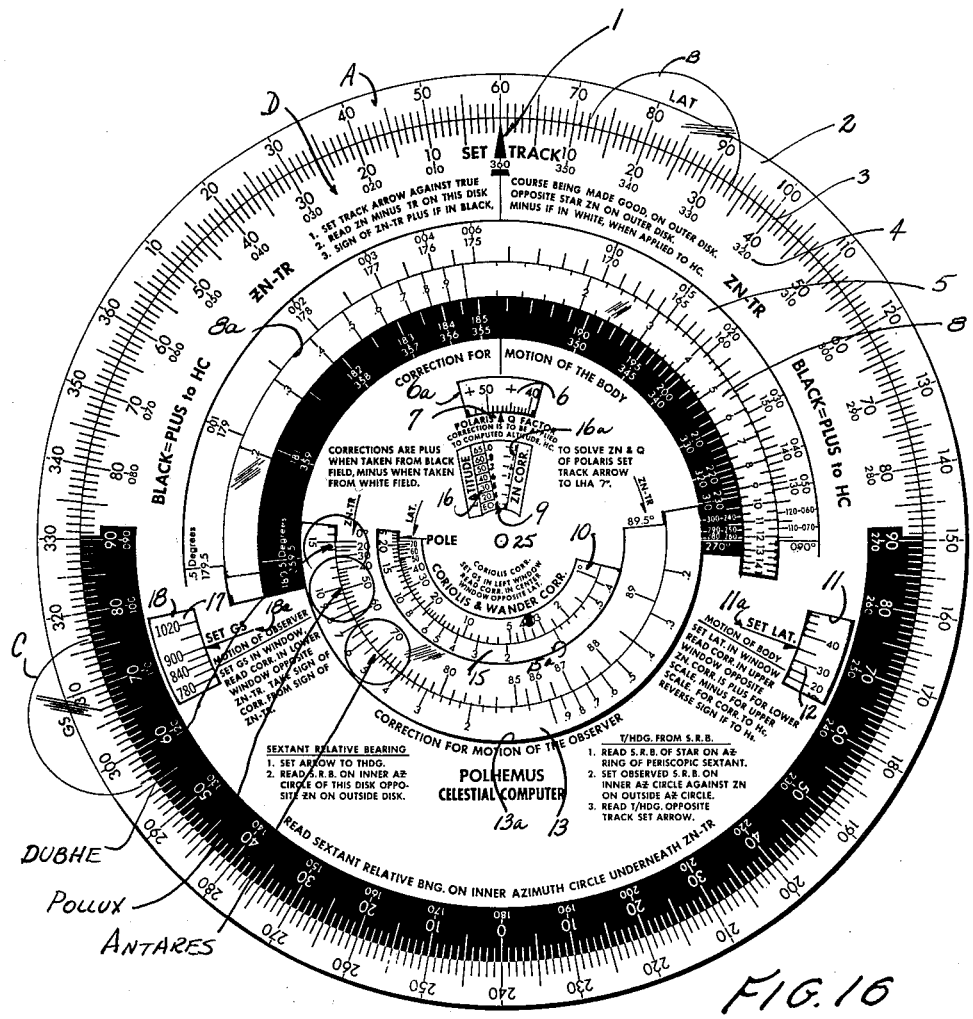
FIGURE 16 is a plan view of the top computer disk and certain of the exposed scales on the under disk C, further illustrating the operation of the device.
Figure 17:
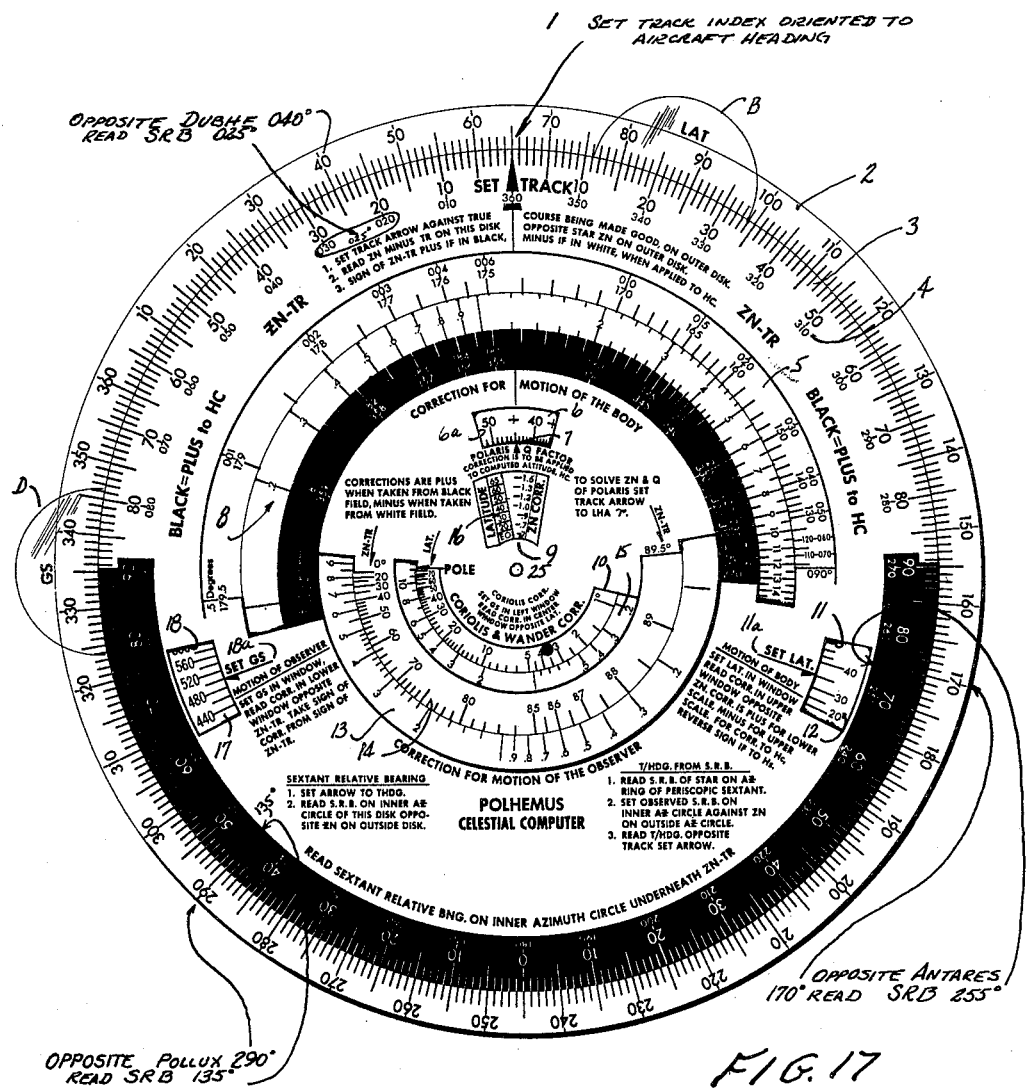
Figure 18:
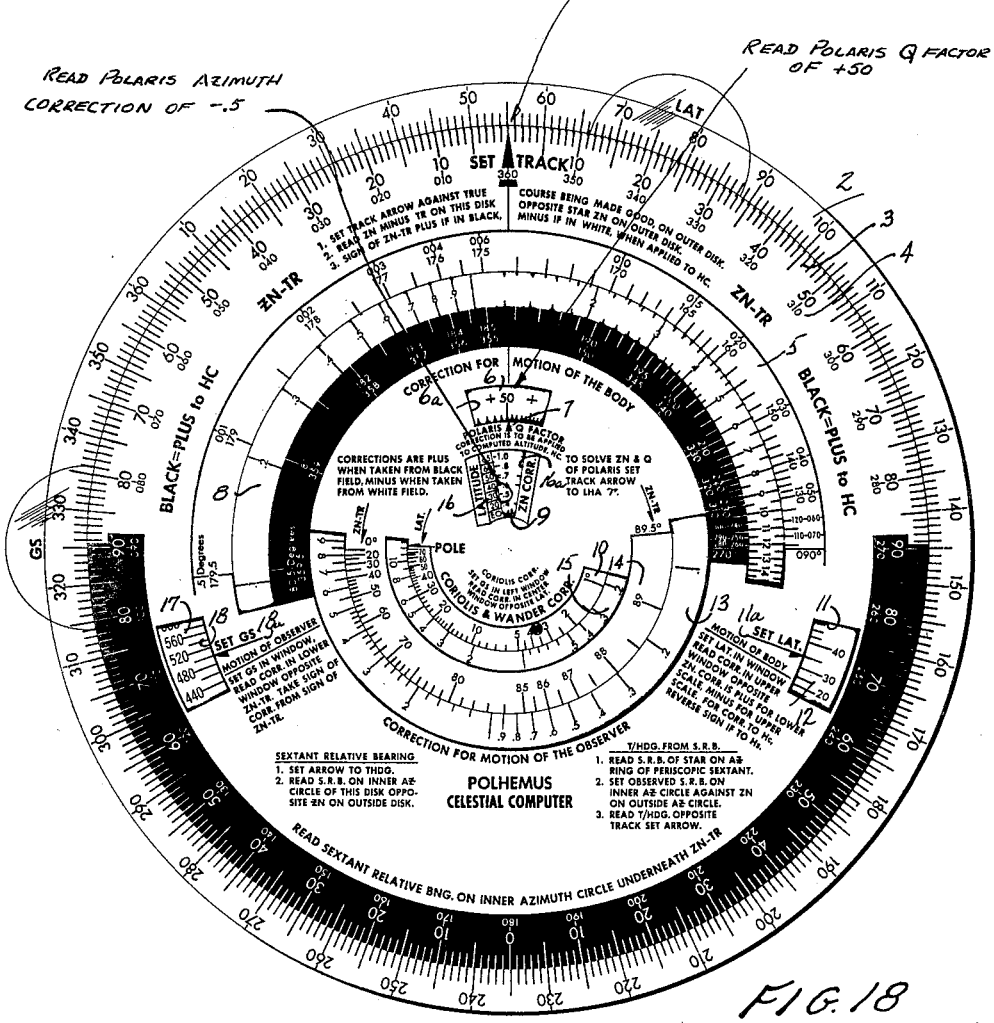
Figure 19:
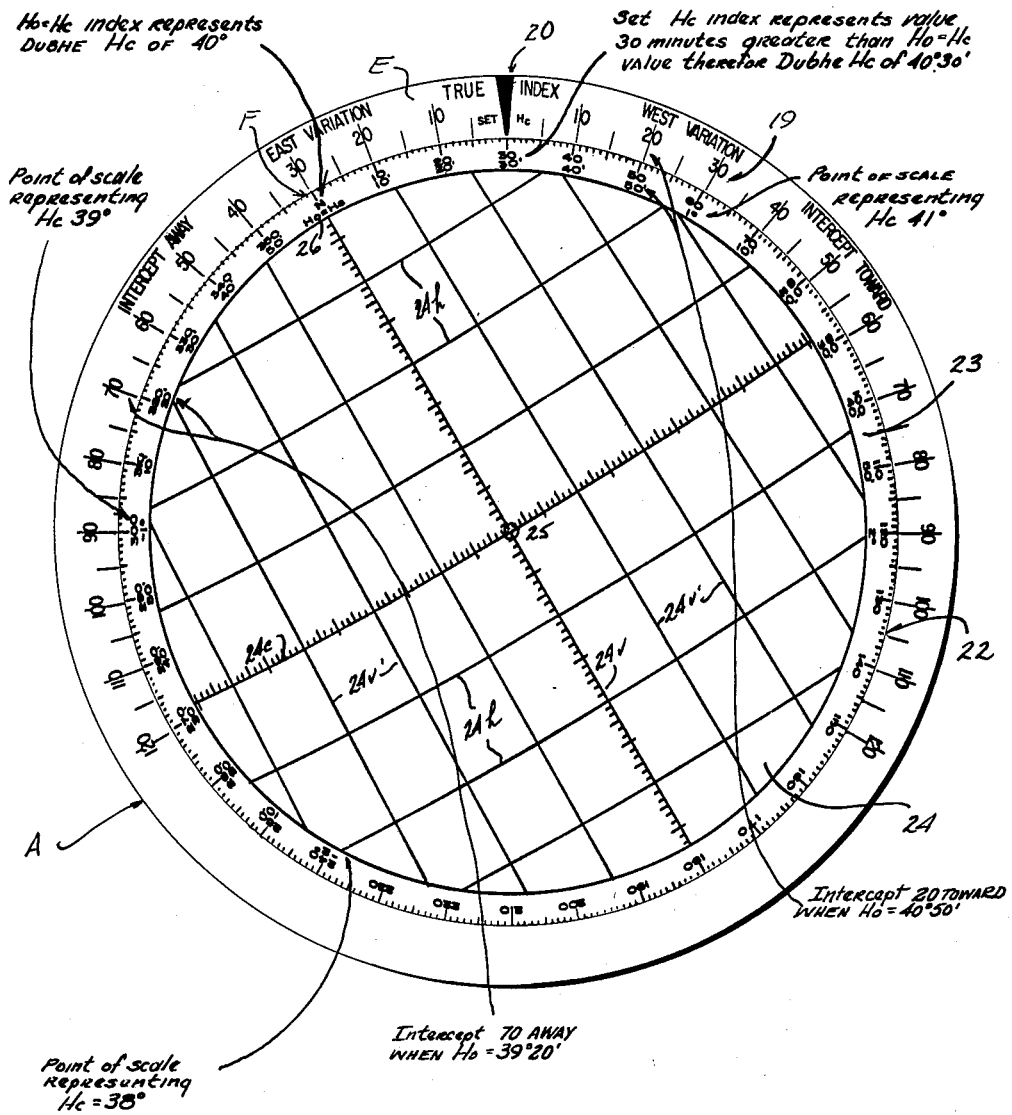
Figure 20:
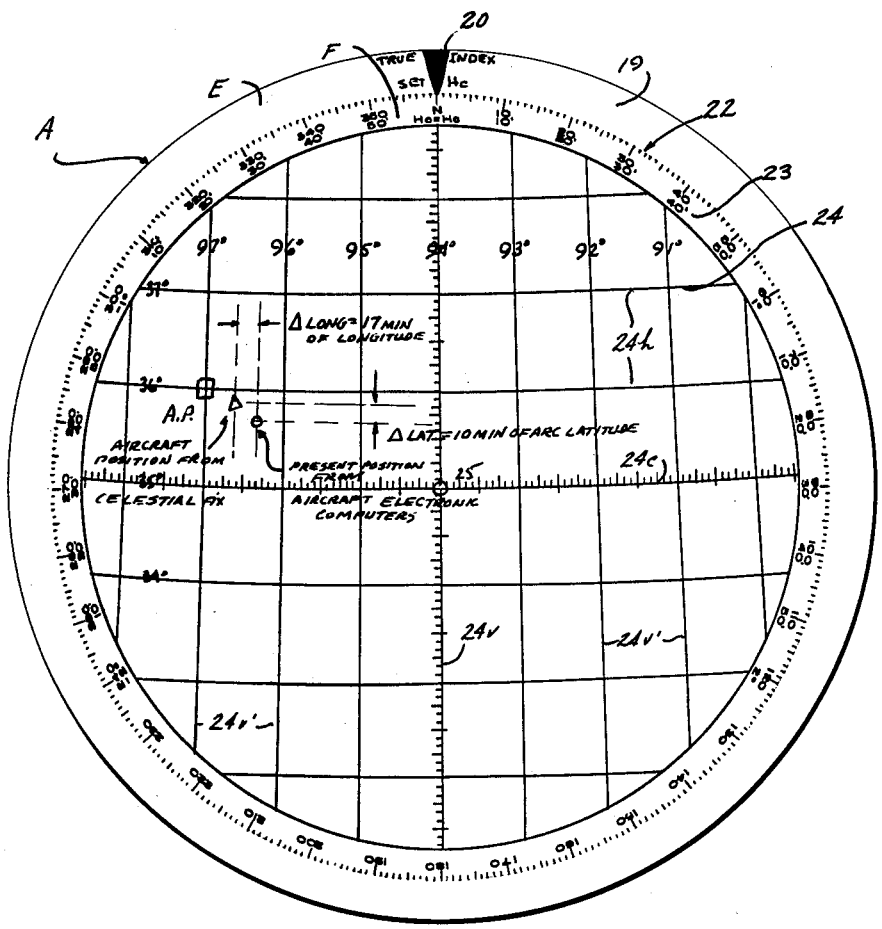
Figure 21:
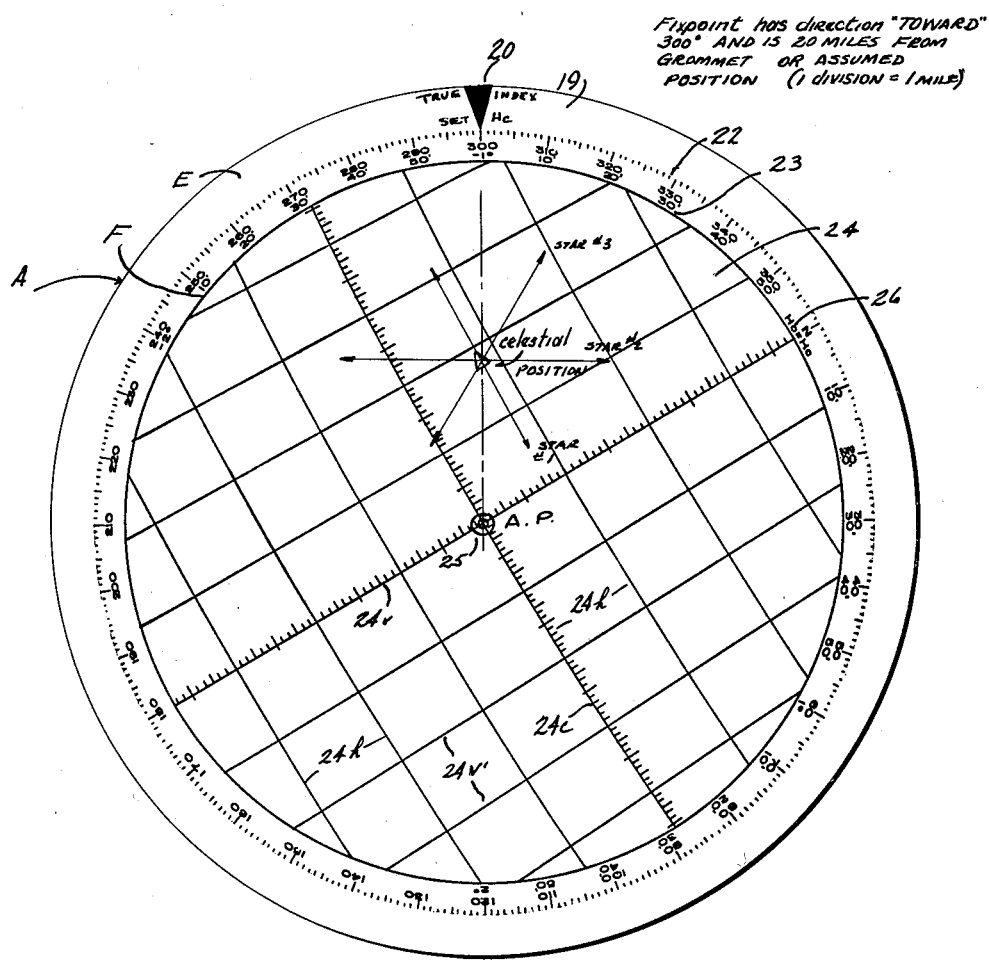

FIGURES 17 and 18 are views similar to FIGURE 16, used to further illustrate the operation of the device in accurately solving celestial navigation problems explained hereafter; and FIGURES 19, 20 and 21 are plan views of the disks "E" and "F" and employed to more clearly illustrate the operation of the device in obtaining the solution of a celestial navigational problem as explained in the following specification, the grid portion 21 which would show through the disk "F" being omitted from these figures.

Figure 1:
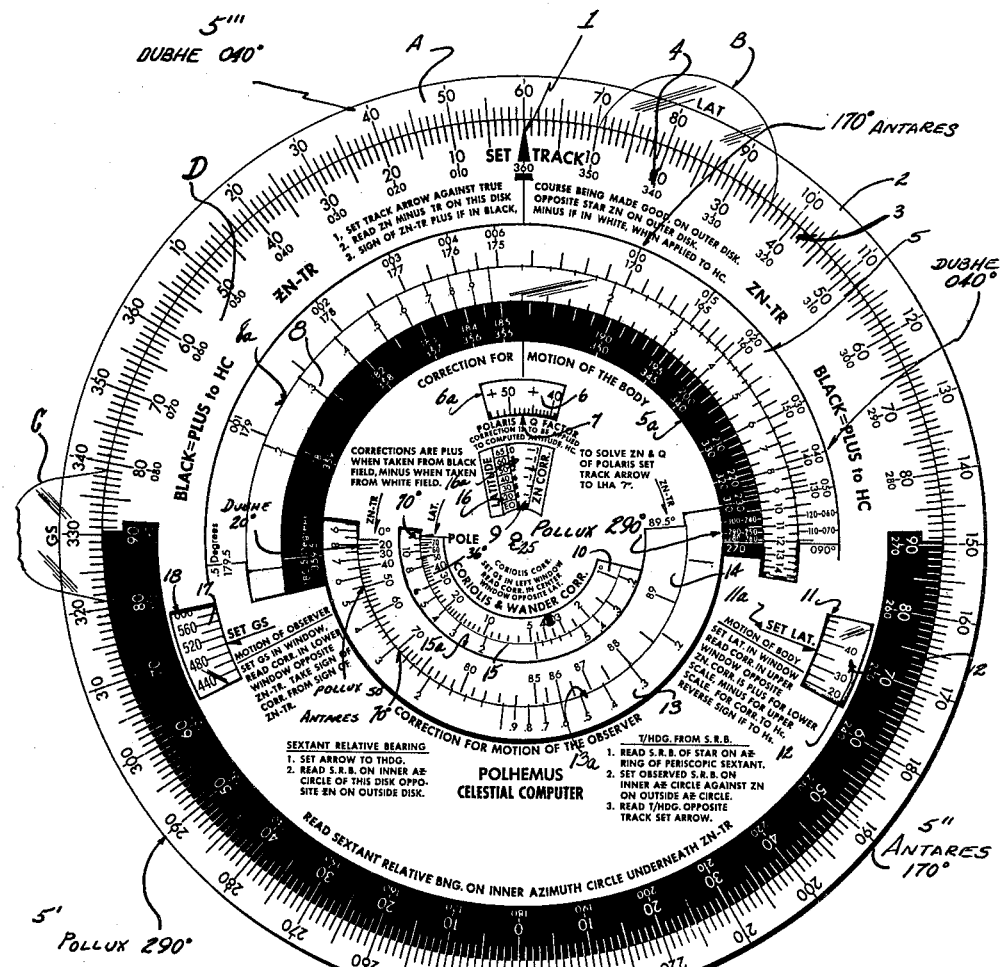
FIGURE 1 is a plan view of the improved celestial computer, having the disks set for the solution of a celestial navigational problem (and solution) later set forth.

The computer side of the device is constructed in the form of a circular slide rule in such a manner that the operation of the LATITUDE setting tab and the GROUND SPEED setting will bring the various scales into their proper relationship. FIGURE 1 shows the computer completely assembled with a sample problem set up.

*a.* The scales on the computer side of the device are listed below:

(1) Set Track Index (FIG. 1, No. 1) _____ 1
(2) True Azimuth Scale FIG. 1, No. 2 _____ 2
(3) Relative Azimuth (Zn minus Track) No. 3 _____ 3
(4) Sextant Relative Bearing Scale (SRB) No. 4 ___ 4
(5) Star True Azimuth (Zn) Scale _____ 5
(6) Polaris Q Factor Scale _____ 6
(7) Polaris Q Factor Index _____ 7
(8) Star Motion Correction Scale (Motion of Body)_ 8
(9) Polaris Azimuth Correction Scale _____ 9
(10) Coriolis Latitude Scale _____ 10
(11) Set Latitude Window _____ 11
(12) Aircraft Latitude Scale _____ 12
(13) Aircraft Relative Motion Scale (Motion of Observer) _____ 13
(14) Relative Azimuth Scale (Zn-Tr, inner scale) __ 14
(15) Coriolis Correction Scale _____ 15
(16) Polaris Latitude Scale _____ 16
(17) Aircraft Ground-speed Scale _____ 17
(18) Set Ground-speed Window _____ 18

*b.* The scales on the computer side of the device are constructed on four separate disks "A," "B," "C," and "D" rotatably adjustable about a common central axis or pivot 25$^a$.

The "A" disk (FIGURE 2) contains True Azimuth, Polaris Q Factor, and Polaris Azimuth Correction Scales 2, 6, and 9, respectively.

Figure 2:
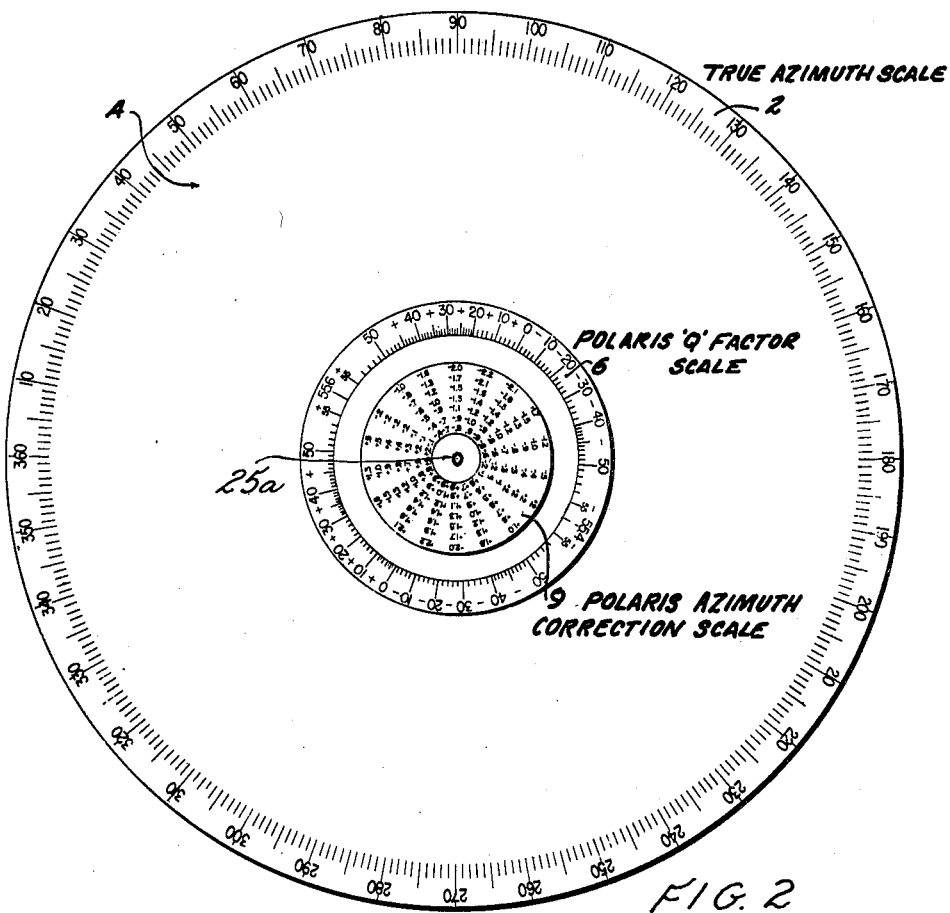
FIGURE 2 is a plan view of one face of the bottom or largest disk, hereafter also referred to as the A disk.

TRUE AZIMUTH SCALE 2 is the outermost scale and is a standard circular scale presenting azimuth angles in one degree increments, zero through 360 degrees, annotated in a clockwise direction. The scale is printed on the base disk (FIGURE 2).

POLARIS Q FACTOR SCALE 6 presents the correction factor in minutes of arc on the earth's surface, (or nautical miles), for the distance that the celestial subpoint of Polaris differs from absolute north pole geographic coordinates. The basic information is extracted from Polaris tables of the Nautical Ephemeris for the year 1959 and assumes that the observer is at 40° north latitude and that the period of the year under consideration is the month of May. The corrections vary from −55.4 minutes of arc at an LHA Aries (local Hour Angle) value of 209° to a value of +55.8 minutes of arc at 028° LHA Aries. The points are tabulated for full minutes of arc and matched against the corresponding degrees of arc on the azimuth scale 2 of the "A" disk. An annual correction will be offered which simply requires a movement of the True Index 1 a small amount for each year. The correction found on the computer is applied with sign as given if to computed altitude of the body and with sign reversed if to observed altitude of the body (FIG. 2).

POLARIS AZIMUTH CORRECTION SCALES 9 appears on the "A" disk as 20° radials of information commencing at a point equivalent to 030° of LHA Aries. The number taken from the scale is a correction to be applied to the angle 360° to correct that value to the true azimuth of Polaris. The scale was constructed by using a Nautical Ephemeris for 1959 and plotting the tabulated azimuth values as given in concentric rings on the "A" disk. The observer's latitude Equator is the innermost ring with the succeeding ring being 20, 30, 40, 50, 60 and 65 degrees of latitude. The correction ranges from minus .9 degrees to plus .9 degrees at the Equator to minus 2.2 degrees through plus 2.2 degrees at 65° north latitude (FIGURE 2).

The "B" disk (FIGURE 3) contains the Aircraft Latitude scale 12 and the Motion of the Body Correction Scale 8. Disk "B" is otherwise transparent.

AIRCRAFT LATITUDE SCALE 12 appears in a window 11 on the lower right side of the upper disk "D" of the computer (FIGURE 1). The scale 12 is printed on disk "B" (FIGURE 3) and is essentially a cosine scale. It is used to solve the equation for Motion of a Celestial Body. The scale originates at a point 110° clockwise from the end of the "15" of the Motion of the Body Correction Scale 8 and terminates 270° later at the point labelled Equator. The first value appearing on the scale 12 is the notation 89.5°. The values then progress at a cosine rate to the zero point or Equator. The scale is laid out using the numerical quantity 90×log cos latitude. When a value of aircraft latitude is positioned in the window 11 opposite the SET LAT index 11$^a$ on the "D" disk, (FIGURE 1) the accompanying "motion correction" scale 8 (FIGURE 3) is correctly oriented in another window 8$^a$ of the "D" disk with relation to the Star True Azimuth scale 5—5$^a$ on the "D" disk.

Figure 3:
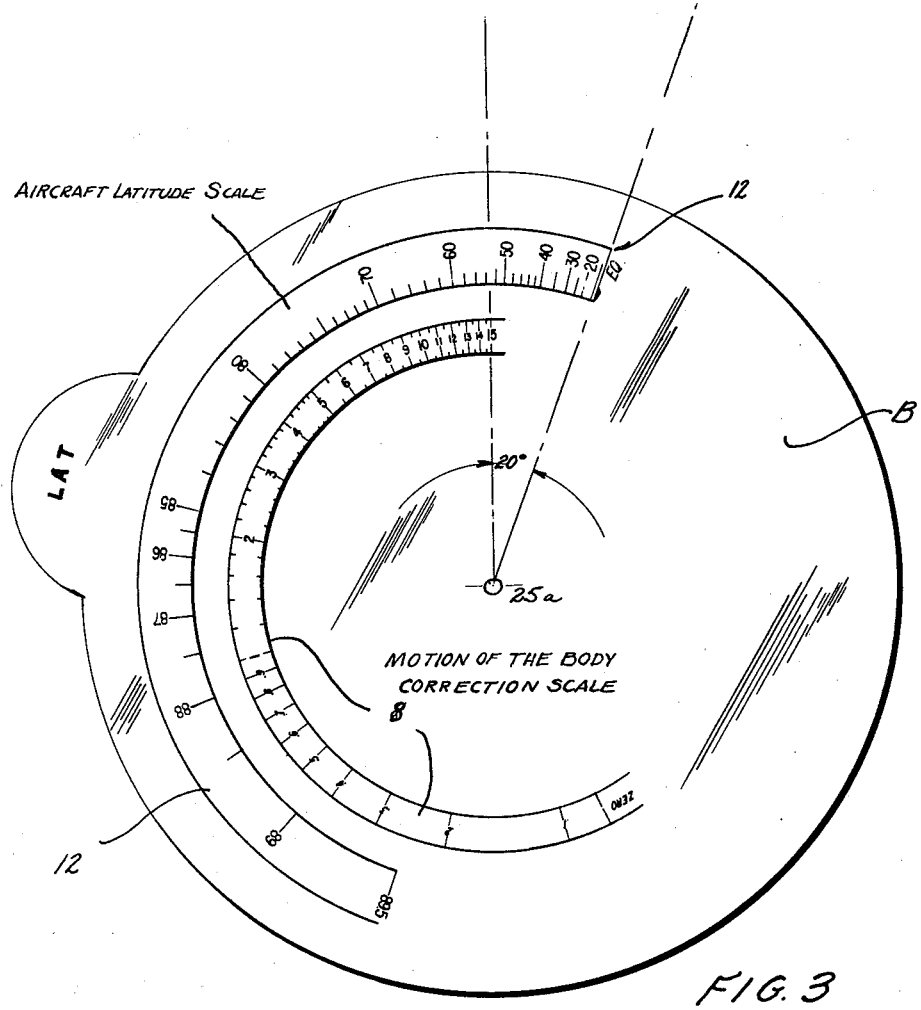
FIGURE 3 is a plan view of the next indicia disk, above the main disk, hereafter also referred to as the B disk.

MOTION OF THE BODY CORRECTION SCALE 8 appears in a window 8$^a$ in the upper portion of the "D" disk (FIGURE 1). The scale 8 is graduated in nautical miles (equivalent to minutes or arc on the earth's surface) and tenths of miles beginning with one tenth of a mile and moving clockwise through an arc of 180 degrees to the number 15. This number represents the maximum relative motion that a celestial body will appear to have during a period of one minute when observed due east of the viewer positioned on the Equator. It satisfies the equation (15 × cos lat × sin Zn=Motion of Body) and is a function of the earth's angular velocity of 900 nautical miles per hour at the equator. The scale 8 is constructed by multiplying the logarithm of distance in miles by 90 where the distance is any value between 1/10 and 15 (FIGURE 3, No. 8).

The "C" disk (FIGURE 4) contains the Aircraft Groundspeed Scale 17, Motion of the Observer Correction Scale 13 and Coriolis Correction Scale 15 and is otherwise transparent.

Figure 4:
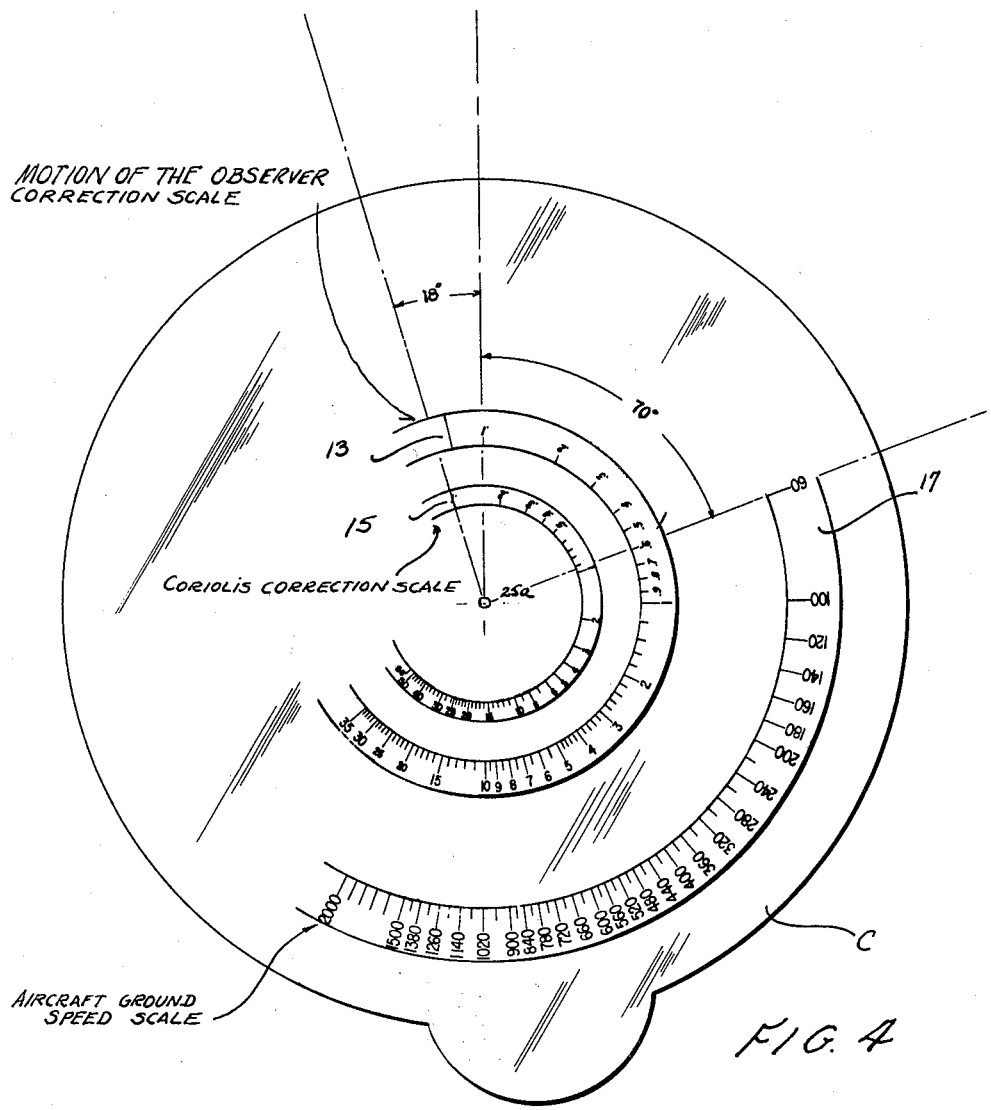
FIGURE 4 is a plan view of the indicia disk next above the B disk, hereafter also referred to as the C disk.

AIRCRAFT GROUND SPEED SCALE 17 appears in a window 18 on the lower left side of the "D" disk at the 8 o'clock position (FIGURE 1, No. 17). The Scale 17 displays a range of ground speed from 60 knots to 2000 knots (FIGURE 4, No. 17). Since the computer solves for a correction in terms of one minute of time the scale is plotted from a table listing the ground speed in one minute increments. Thus 60 knots is 1 mile and 2000 knots 33.33 miles. The intermediate points of the scale 17 are calculated by multiplying (90×log 1/60 GS in knots). The presence scale 17 is annotated in 20 knot increments from 100 knots to 600 knots, 30 knot increments to 900 knots, 60 knot increments to 1500 knots and 100 knot increments to 2000 knots. Production models will incorporate further incremental divisions.

MOTION OF THE OBSERVER CORRECTION SCALE 13 on the "C" disk is read out in the lower window 13$^a$ of the "D" disk (FIGURE 1, No. 13). This is the answer the navigator reads out when he has correctly oriented the computer for ground speed and Zn-Tr. This correction is the one which considers the star's apparent motion due to the movement of the aircraft over the earth's surface. The maximum relative motion that the star may appear to have is directly related to the aircraft's speed and the relationship of the star to the longitudinal axis of the aircraft. That is, if the star is directly ahead of the aircraft, the navigator will appear to be approaching the star at a ground speed rate; 1 mile per minute at a ground speed of 60 knots and 33.33 miles per minute at 2000 knots ground speed. The motion of the observer correction 13 will vary at a cosine rate as the observed star moves from the position directly ahead of the aircraft to a position directly abeam, where it will appear not to have relative motion. The corrections found on the computer are drawn on the "C" disk so that they increase in a clockwise direction from 1/10 mile to a maximum of 35 miles (or minutes of arc). The scale 13 is calculated by multiplying (90×log "n") where "n" is any number falling between 1/10 and 35. The scale 13 originates at a point 70 degrees counterclockwise from the start point of the ground speed scale 17 (FIGURE 4, No. 13).

CORIOLIS CORRECTION SCALE 15 located on the "C" disk is read out in a window 15a of the "D" disk just above the Zn-Tr scale 14 (FIGURE 1, No. 15). This scale presents the corrections which satisfy the equation (2.62×1/100 GS×sin latitude) where 2.62 equals a constant related to the angular velocity of the earth, 1/100 GS is an expression of ground speed, sin latitude corrects the equation for the true latitude of the aircraft. The extremes of this scale 15 for the speed range considered on this computer range from zero to 55 nautical miles. This correction is applied to the celestial fix to correct for the error in position due to the acceleration force imposed on the artificial horizon of the navigator's sextant. The points between zero and 55 are located by multiplying (90×log "n") where "n" is any number between zero and 55. The scale 15 is started at a point 88° counterclockwise from the start point of the ground speed scale 17 of the "C" disk so that orientation of this disk to correct ground speed will cause the Coriolis correction scale 15 to be properly located with regard to its companion latitude scale 10 on the "D" disk (FIGURE 4, No. 3).

The "D" disk (FIGURE 5) contains the Set Track Index 1, Star Relative Azimuth (Zn-Tr) 3, Sextant Relative Bearing (SRB) 4, Star True Azimuth (Zn) 5, Coriolis Latitude Scale 10, Zn-Tr (Inner), Polaris Q Factor Index 7, Polaris Latitude 16, Set Latitude Index 11a, and Set Ground Speed Index 18a.

Figure 5:
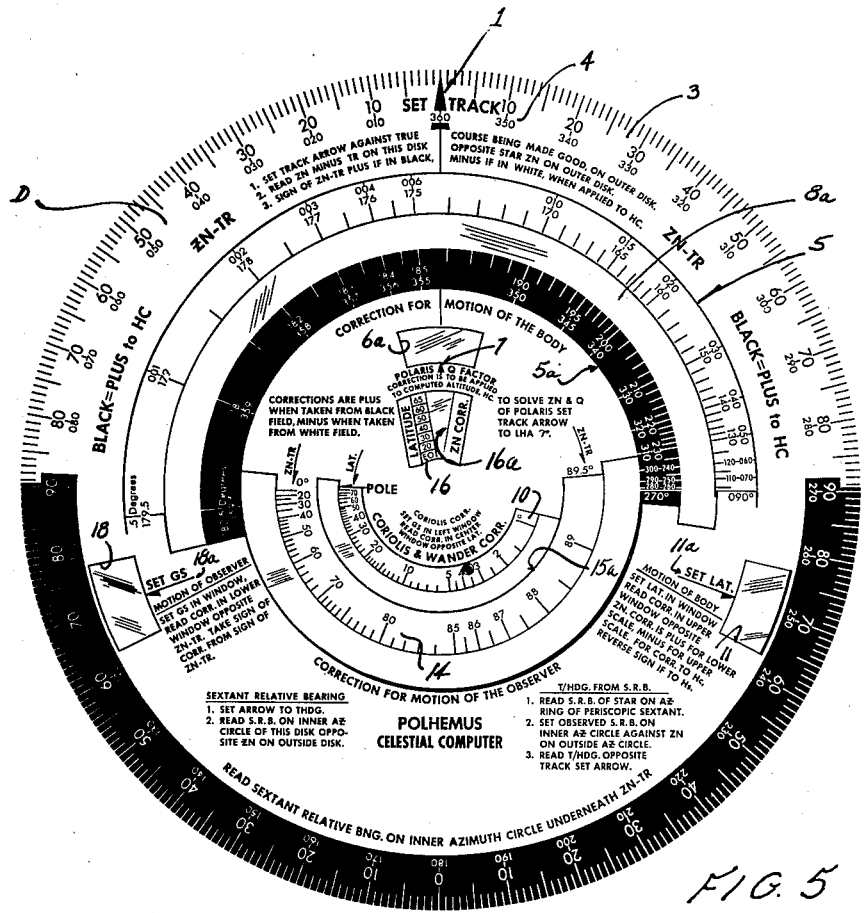
FIGURE 5 is a plan view of the top disk, next above the C disk hereafter referred to as the D disk.

SET TRACK INDEX 1 is the starting point for the Relative Azimuth Scale 3 on the periphery of the "D" disk, the Sextant Relative Bearing Scale 4, and represents the basic index of the computer for setting aircraft direction of flight and Local Hour Angle of Aries (FIGURE 5).

RELATIVE AZIMUTH (ZN MINUS TRACK) scale 3 is on the periphery of the "D" disk (FIGURE 5). It is immediately adjacent to the True Azimuth Scale 2 of the "A" disk and is used in conjunction with the True Azimuth Scale 2 to determine the relative azimuth of the star. There are four separate scales presented, each running from zero to 90 degrees. The zero points are common to two scales and are located at points equivalent to nose and tail of the aircraft. The 90 degree points are common to two scales and are located at points equivalent to the left and right wing-tips of the aircraft. The scales are annotated in one degree increments. These scales are given algebraic signs according as their relationship changes with respect to the lateral axis of the aircraft. A star having a relative azimuth ahead of the aircraft falls within the white field and is considered to be minus in algebraic sign for adjustments made to star computed altitude, Hc. A star having a relative azimuth behind the aircraft falls within the dark field and is considered to be positive in algebraic sign for adjustments made to star computed altitude, Hc. The signs are reversed if the adjustments are made to sextant altitude, Hs.

SEXTANT RELATIVE BEARING SCALE 4 is located immediately adjacent to the Relative Azimuth Scale 3 on the "D" disk (FIGURE 1, No. 4 and FIGURE 5, No. 3). It is annotated in one degree increments, zero through 360 degrees, running in a counterclockwise direction from the Set Track Index 1.

STAR TRUE AZIMUTH SCALE (5—5a) commonly called ZN of star, is located on the upper hemisphere of the "D" disk (FIGURE 5, 5 and 5a). Two scales 5 and 5a are presented bracketing a window 8a through which is read the Motion of Body (FIGURE 1, No. 8). These scales 5 and 5a are sine scales originating at the nine o'clock position on the "D" disk and rotating clockwise to about the three o'clock position. They are annotated in such a manner that the angles ½ degree to 90 degrees and back to 179½ degrees appear on a scale 5 above the window; and the angles 180½ through 270 degrees and back to 359½ degrees appear on the scale 5a below the window. The scale originates at a point which is 70 degrees in a clockwise direction from the index mark 11a of the SET LATITUDE window 11. The scale is constructed from a table of values which satisfy the equation (90×log sin star azimuth angle). These scales are given algebraic signs according as the stars appear in the east or the west. A star having an azimuth between zero and 180° will be located in the white field 5 above the window and is given a minus sign for corrections that are to be applied to computed star altitude, Hc. A star having an azimuth between 180 and 360 degrees will be located in the dark field 5a below the window 8a and is given a plus algebraic sign for corrections that are to be applied to computed star altitude, Hc. The signs are reversed if the correction is made to sextant altitude, Hs. Note that the smallest value visible on the scale is ½ degree.

CORIOLIS LATITUDE SCALE 10 is located on the "D" disk (FIGURE 5) above the central window 15a in the lower hemisphere of the computer (FIGURE 1, 10) and is annotated in degrees of latitude starting at the 3:30 o'clock position and progressing in a clockwise direction to the pole (north pole). The scale 10 is a sin scale permitting the navigator to consider aircraft latitude in seeking coriolis correction to apply to the celestial fix. The points of the scale 10 are calculated from the equation (90×sin "a") where "a" equals the latitude in question. The scale 10 originates at a point 110° clockwise from the ground speed index arrow 18a at the window 18 of the "D" disk. The smallest value visible on this scale is one degree (FIGURE 5, 10).

RELATIVE AZIMUTH (Zn-Tr, Inner) SCALE 14, (FIGURE 1, 14) is located over the Motion of the Observer Correction window 13a. The scale 14 is labelled in degrees of arc and is a cosine scale which allows the navigator to complete the multiplication of Zn-Tr in the equation Motion of Observer=1/60 GS×cos Zn-Tr. The intermediate points of the scale 14 are calculated by multiplying 90×log cos "a" where "a" is the particular azimuth angle. The scale 14 originates at a point 110 degrees clockwise from the ground speed index arrow 18a at the window of the "D" disk. The first graduation printed out on the scale is that of 89.5° (FIGURE 5, 14).

POLARIS Q FACTOR INDEX 7 is an extension of the SET TRACK index 1. It is located immediately adjacent to the window 6a out of which is read the Q factor of Polaris on scale 6 (FIGURE 5, 7).

POLARIS LATITUDE SCALE 16 is located on the upper center portion of the "D" disk and is used to locate the correct value of azimuth correction from the "A" disk. The points which are labelled Equator, 20, 30, 40, 50, 60 and 65 degrees of north latitude are laid out in such a manner that they are distances equivalent to the radii of the concentric circles of azimuth correction values 9 on the "A" disk (FIG. 5, No. 16).

SET LATITUDE INDEX 11a ADJACENT TO THE WINDOW 11 on the lower right side of the "D" disk establishes the reference point for the Aircraft Latitude Scale 12 on the "B" disk and is oriented exactly twenty degrees of arc in a clockwise direction from the 090/270 degree point of the Star True Azimuth Scale 5—5a (FIG. 5, No. 11a).

SET GROUND SPEED INDEX 18a ADJACENT TO THE WINDOW 18 on the lower left side of the "D" disk establishes the reference point for the Aircraft Ground Speed Scale 17 on the "C" disk and is oriented exactly twenty degrees of arc counter clockwise from the zero degree point of the Zn-Tr scale 3 and the Pole position of the Coriolis Correction Latitude Scale 10 (FIG. 5, No. 18a).

Figure 6:
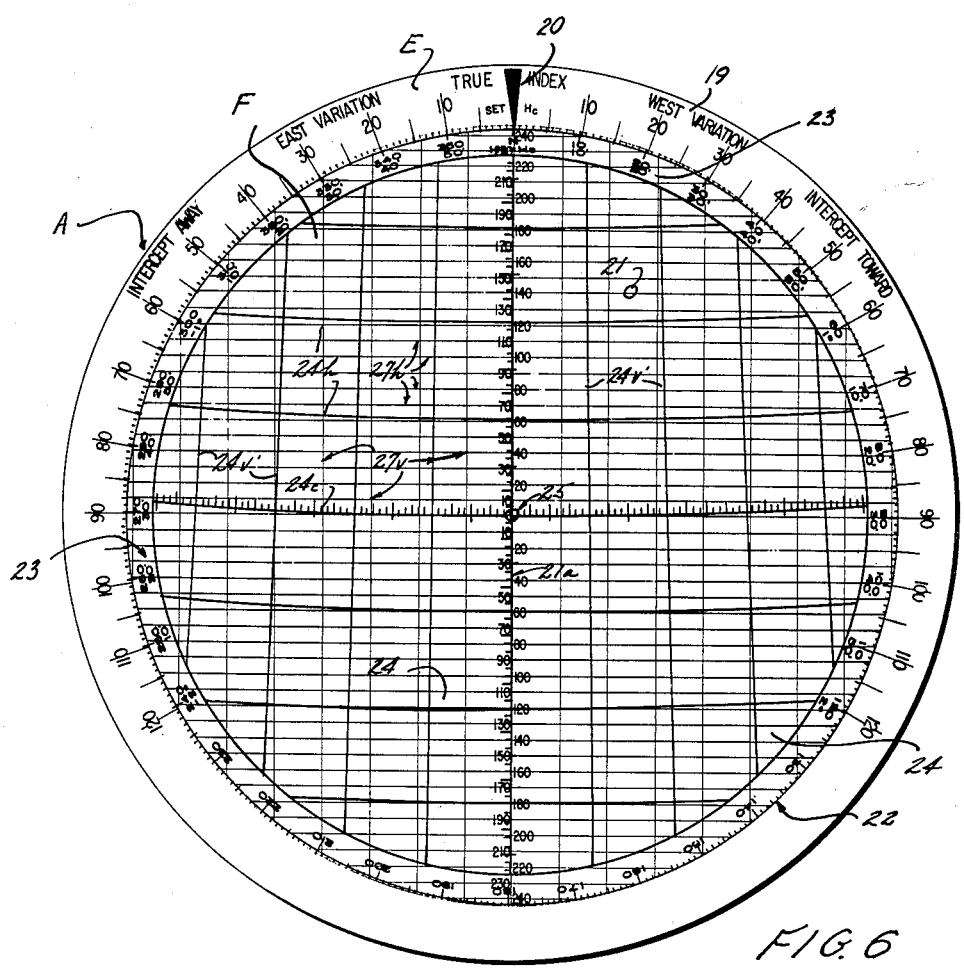
FIGURE 6 is a plan view of the reverse side of the celestial computer hereafter referred to as the plotter portion.

The plotter side of the device (FIG. 6) is constructed in the form of a circular plotting board with a rectilinear grid as the basic reference system. This grid has a scale of one inch equals five million inches on the earth's surface, which compares with a particular map projection used by navigators of high speed aircraft. It is contemplated that there will be interchangeable plotting disk included which is constructed at a scale of one inch equals two million inches on the earth's surface. This compares with a navigational chart known as the Jet Navigation series and is used by slower aircraft. The writing surface 24 is constructed with a graticule imprinted which approximates that of a Lambert Conformal Map Projection. Additional templates or disks will be included in the production kit to provide surfaces equivalent in scale to map projections at 25, 35, 45, 55 and 65 degrees of latitude for the 1:5,000,000 scale projection. These templates or disks will be interchangeable in flight to match the geographic location of the aircraft.

The scales of the plotter are as follows:

(19) Variation and Intercept Distance Scale (FIG. 6)_ 19
(20) True Index_____ 20
(21) Distance Scale and Rectilinear Grid_____ 21
(22) Peripheral Azimuth Scale_____ 22
(23) Ho–Hc Subtraction Scale_____ 23
(24) Map Projection and Plotting Surface_____ 24
(25) Grommet _____ 25
(26) Ho–Hc Index_____ 26

Figure 7:
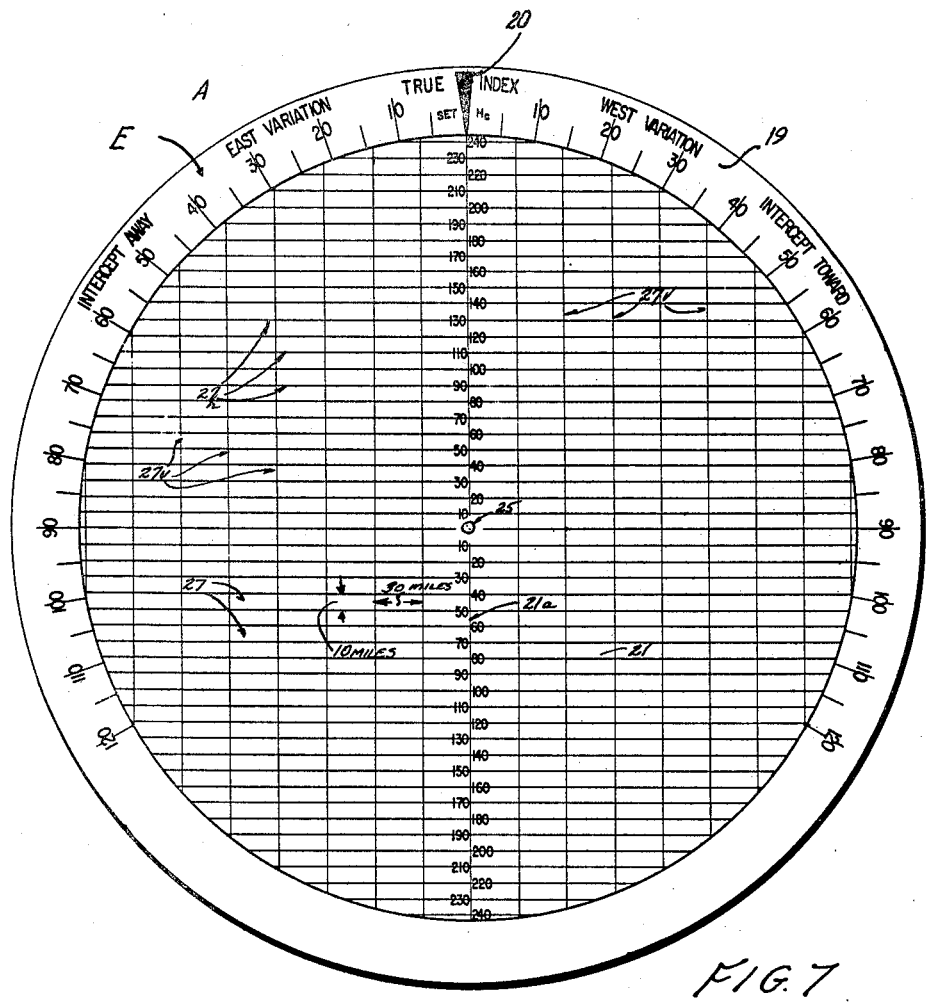
FIGURE 7 is the reverse or back side of the A disk, also referred to as the E disk.
Figure 8:
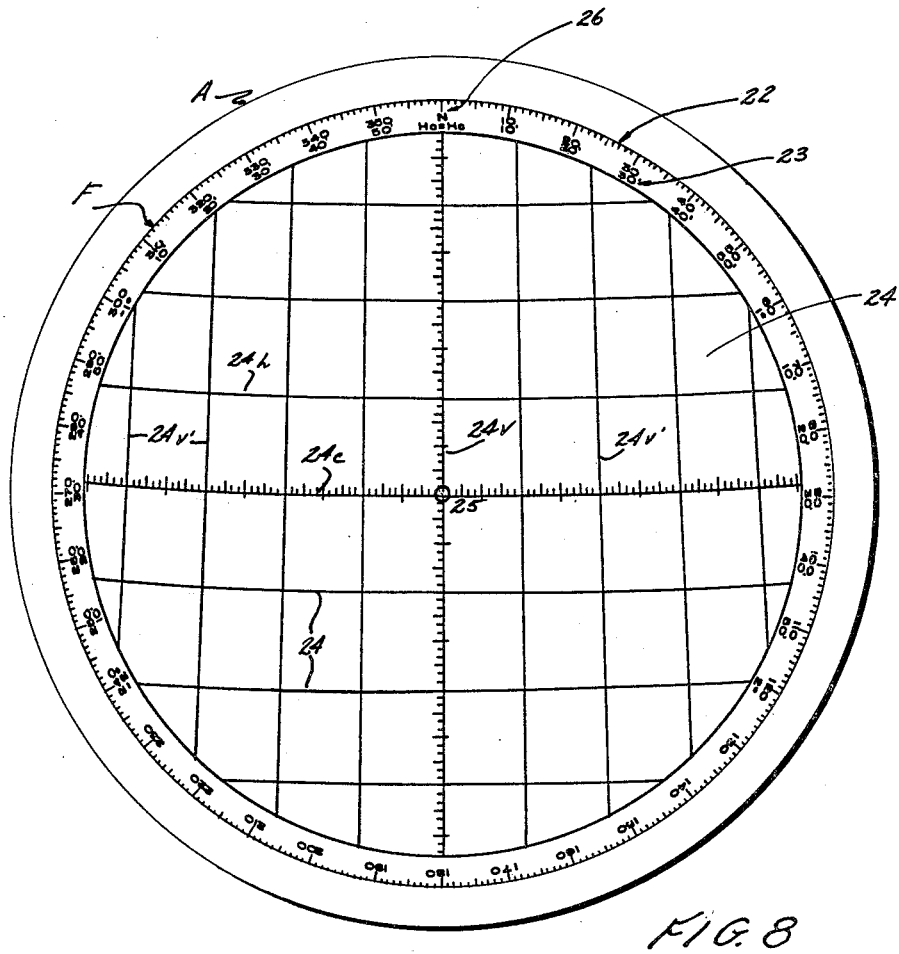
FIGURE 8 is the removable translucent plotting disk, disposed next to or in front of the E disk.

Construction of scales and graticules is made on two disks, labelled the "E" disk and the "F" disk, FIGS. 7 and 8, respectively.

The "E" disk (FIG. 7) contains the Variation and Intercept Scale 19, Distance Scale and Rectilinear Grid 21, and the True Index 20, with a "Set Hc" notation. This "E" disk is the reverse side, preferably of the "A" disk.

VARIATION AND INTERCEPT SCALE 19 is a partial azimuth scale of 240 degrees extent. The zero point is midway in the scale and is labelled True Index 20. The scale extends counterclockwise to 120 degrees and is annotated "INTERCEPT AWAY" and "EAST VARIATION." The scale also extends clockwise to 120 degrees and contains the annotations "INTERCEPT TOWARD" and "WEST VARIATION" (FIG. 7, No. 19).

DISTANCE SCALE AND RECTILINEAR GRID 21, FIG. 7 is constructed by choosing a length equal to 10 nautical miles of distance at 35 degrees of latitude on a USAF Global Navigation Chart of scale 1:5,000,000. The grid extends from minus 240 miles to plus 240 miles in 10 mile increments for a total usable distance of 480 nautical miles. The vertical lines 27V are constructed perpendicular to the horizontal lines 27h and are spaced at 30 mile intervals (FIGURE 7, No. 21).

TRUE INDEX 20 is the top of the plotter disk "E" and is an extension of the central meridian 21ᵃ of the rectilinear grid. It is the reference point for aligning the associated plotting surface of disk "F." A notation "Set Hc" shares the same reference point (FIG. 7, No. 20).

The "F" or top disk (FIG. 8) contains the peripheral Azimuth Scale 22, the adjacent Ho–Hc Substration Scale 23, the map projection and plotting surface 24, Grommet 25, and Ho–Hc index 26.

AZIMUTH SCALE 22 on the periphery of the plotting disk is laid out in one degree increments, clockwise zero degrees through 360 degrees (FIG. 8).

Ho–Hc SCALE 23 is a subtraction scale layed out in one degree increments of arc and occupying 240 degrees of arc on the surface of the plotting disk "F." The scale 23 originates at the 8 o'clock relative position of the disk and increases in a clockwise direction from the point annotated minus 2 degrees to a point annotated plus 2 degrees, at the 4 o'clock relative position. The scale 23 is used to compare observed celestial sights with computed values. The Ho–Hc 26 point is considered the base altitude set in the sextant in even degrees. The minutes of arc (that the observation differs from the computed value of star elevation) related to the plus or minus side of the Ho–Hc point was made equivalent to a star elevation of 30 degrees, a sight of 29°30′ would be considered as falling at the first 30 annotation counterclockwise from the Ho–Hc point (FIG. 8, No. 23).

MAP PROJECTION AND PLOTTING SURFACE 24 is a transparent surface on which the navigator plots with pencil a vector solution of the celestial fixing problem. The scale is laid out using the grommet 25 or central mounting point, as the start point. The horizontal lines 24h, as illustrated, are simulated parallels of latitude having a radius of curvature equal to the curvature of the 35th parallel of latitude on USAF Global Navigation Chart. The intervals between parallels 24h are one degree increments, that is 60 nautical miles, and are made to coincide with the 60 mile points of the rectilinear grid on the central meridian 24c. The vertical lines 24v′ are caused to converge in such a manner that they are perpendicular to the parallels 24h, 24v′ at their particular points of intersection. The horizontal distance between the meridians 24v′ (the vertical lines) is established on the center parallel 24v of latitude and is computed by using (cosine latitude times 60 miles) as the measure, (FIG. 8, 24v′).

GROMMET 25 is the center of the plotter and the reference point for several of the plotting operations, (FIG. 8, No. 25) and the mounting and pivotal contours for the disks B, C, D and F.

Ho=Hc INDEX 26 is the 360 degree point of the peripheral azimuth scale on the plotting surface, (FIG. 8, No. 26).

OPERATING INSTRUCTIONS (1) The computer side provides the following information to the navigator:
  a. Motion of the celestial body;
  b. ZN minus Track (Star relative azimuth);
  c. Motion of the observer;
  d. Coriolis acceleration correction;
  e. Q factor of Polaris;
  f. Azimuth correction for Polaris;
  g. Sextant Relative Bearing;
  h. True Heading from sextant relative bearing;
  i. Acceleration correction factor for wander error;
  j. Acceleration correction factor for ground speed or true air speed change.

(2) The plotter side provides the navigator with the means to determine:
  a. Relative position of celestial fix with respect to assumed aircraft position;
  b. True position of the aircraft in latitude and longitude;
  c. Latitude and longitude correction values to set into automatic navigation systems;
  d. Track and distance run between celestial fixes;
  e. True course and distance to destination;
  f. Magnetic course to destination;
  g. Intercept distance.

(3) The proper use of the computer is illustrated in the following sample problem:
  a. Given: An aircraft traveling northeast on a track of 060° at a ground speed of 500 knots. The navigator estimates his position to be 36° North Latitude and 97° West Longitude. He chooses from suitable navigation sight reduction tables the stars POLLUX, ANTARES, and DUBHE and enters information concerning them on the computation form, FIG. 9. The observation times, computed altitudes and azimuths, and actual sextant observations are shown to be:

| Star | POLLUX | ANTARES | DUBHE |
| --- | --- | --- | --- |
| Tabulated altitude | 37°20′ | 20°15′ | 40°15′ |
| Tabulated azimuth | 290° | 170° | 040° |
| Sextant observation | 38°40′ | 20°30′ | 40°50′ |
| Time | 0955Z | 0958Z | 1001Z |
| Fix time | | | 1000Z |
| Time diff (shot to fix) | :05′ | :02′ | −:01′ | b. Find: All the corrections necessary to make the sights fit a fix time of 1000 Zulu and then determine the true geographic position of the aircraft.

c. Procedure:

(1) Set aircraft track of 060° on disk A against the SET TRACK INDEX 1 on disk D; the black arrow at the top of the computer (FIG. 1, No. 1);

(2) Set aircraft latitude of 36° on disk B in the window 11 at the right against the SET LAT index 11a (FIG. 1).

(3) Set aircraft Ground Speed of 500 knots on the disk C in the window 18 at the left of the computer against the SET GS INDEX 18a, (FIG. 1).

(4) Read Motion of the Body for all three stars in the top window 8a opposite the respective star true azimuth values at 5', 5'', 5'''.

| (a) | (5')<br>POLLUX | (5'')<br>ANTARES | (5''')<br>DUBHE |
|---|---|---|---|
| Opposite 290° in the dark field read | +11.5 | | |
| Opposite 170° in the white field read | | −2.1 | |
| Opposite 040° in the white field read | | | −7.8 |

(b) Note that the signs of the adjustment will be negative for azimuth taken from the white field 5, that is for true azimuth of zero to 180°, and will be positive for azimuth found in the dark field 5a, that is for true azimuth of 180° to 360°.

(5) Determine star relative azimuth (Zn-Tr) by noting the relative azimuth value on the periphery 3 of disk D, the top disk, which matches the true azimuth values located on the outer azimuth scale 2 of the base disk A. The sign of the value will be taken at this time. Relative azimuths located in the dark field of the scale 3 will have a positive sign and those taken from the white field a negative sign.

(a) Opposite 290° on the outermost scale 2 read +50° relative azimuth for Pollux on the inner scale, (FIG. 1 at 5').

(b) Opposite 170° on the outermost scale 2 read +70° relative azimuth for Antares on the inner scale, (FIG. 1 at 5'').

(c) Opposite 040° on the outermost scale 2 read −020° relative azimuth for Dubhe in the white inner scale, (FIG. 1 at 5''').

(6) Determine Motion of the Observer for all three stars in the lower window 13a of the computer opposite the respective relative azimuth values 13 of the preceding step. Remember to retain the sign of the relative azimuth value.

| (a) | POLLUX | ANTARES | DUBHE |
|---|---|---|---|
| Opposite 50° on the inner Zn-Tr scale 14 | +5.2 | | |
| Opposite 70° on the inner Zn-Tr scale 14 read | | +2.8 | |
| Opposite 20° on the inner Zn-Tr 14 read | | | −7.9 |

(7) The two sets of values, Motion of the Star, and Motion of the Observer are next brought together algebraically and then multiplied by the time difference value to arrive at the total adjustment that will be made to the tabulated value of star altitude.

| Star | POLLUX | ANTARES | DUBHE |
|---|---|---|---|
| Motion of the Body | +11.5 | −2.1 | −7.8 |
| Plus Motion of the Observer | +5.2 | +2.8 | −7.9 |
| Adjustment for 1 minute of time | +16.7 | +.7 | −15.7 |
| × Time difference | ×+5 | ×+2 | ×−1 |
| Total adjustment to tabulated altitude | +83.5' | +1.4' | +15.7' |

(8) With the computer still set for ground speed 500 knots read the correction to apply to the fix for the aceleration due to coriolis effect. Opposite 36° latitude on the Coriolis/Wander scale 10, (FIG. 1) read 7.7 miles in the adjacent window 15a. This correction will be applied to the fix itself.

(9) The next step is to combine the total adjustments determined in (7) above with tabulated altitude and then to compare the result with the observed altitude of the body. The comparison produces a quantity termed "intercept distance" which is used in plotting the fix.

| (a) | POLLUX | ANTARES | DUBHE |
|---|---|---|---|
| Tabulated altitude from sight reduction tables | 37°20' | 20°15' | 40°15' |
| Total adjustment determined in step (7) | +83.5' | +1.4' | +15.7' |
| Computed altitude of star, Hc | 38°43.5' | 20°16.4' | 40°30.7' |
| Observed altitude of star, Ho | 38°40.0 | 20°30.0 | 40°50.0 |
| Subtract Hc from Ho to find Intercept (sign is plus if Ho is larger) | −3.5 | +13.6 | +19.3 |
| | Away fm. | Toward | Toward |
| The intercepts are then related to the azimuth direction by describing a plus intercept as Toward the azimuth and a minus intercept as Away from the azimuth | 290 | 170 | 040 |

Figure 10:
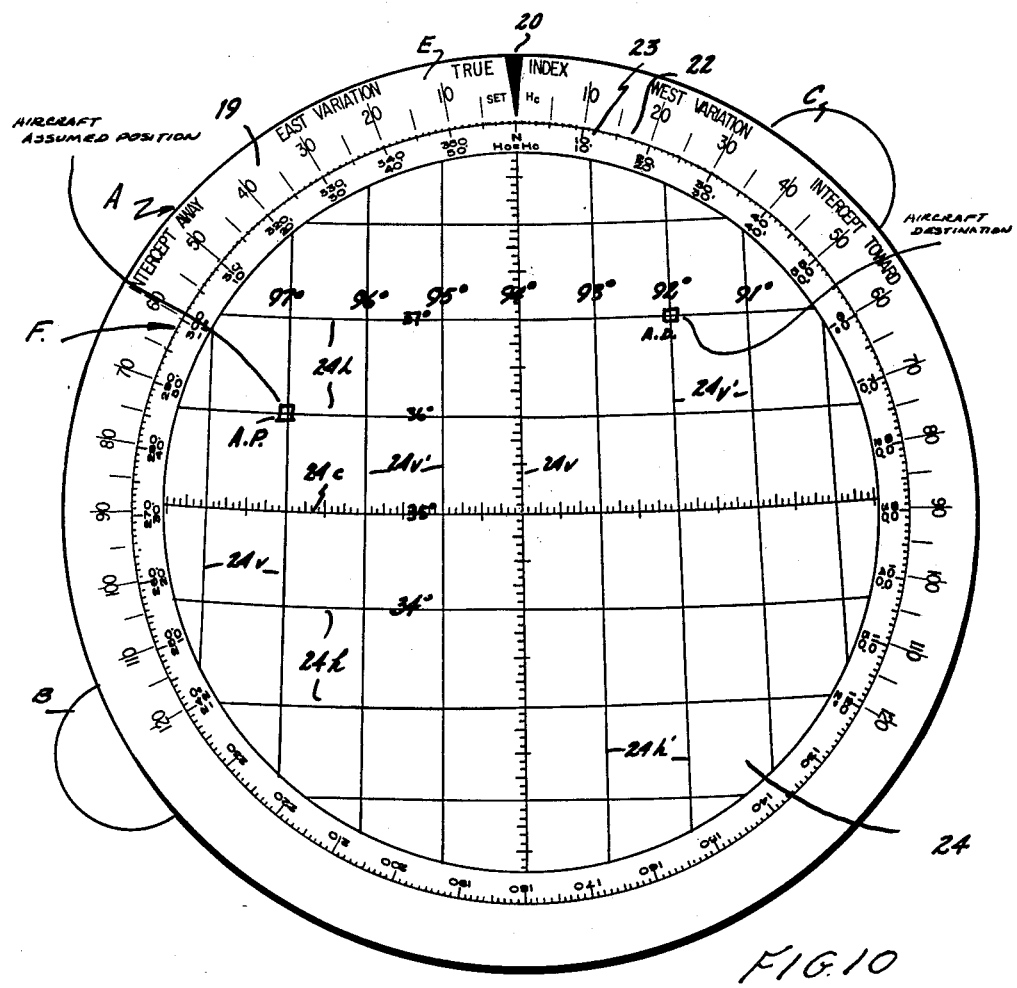
FIGURE 10 is a view similar to FIGURE 6, with grid 21 being also omitted.
Figure 11:
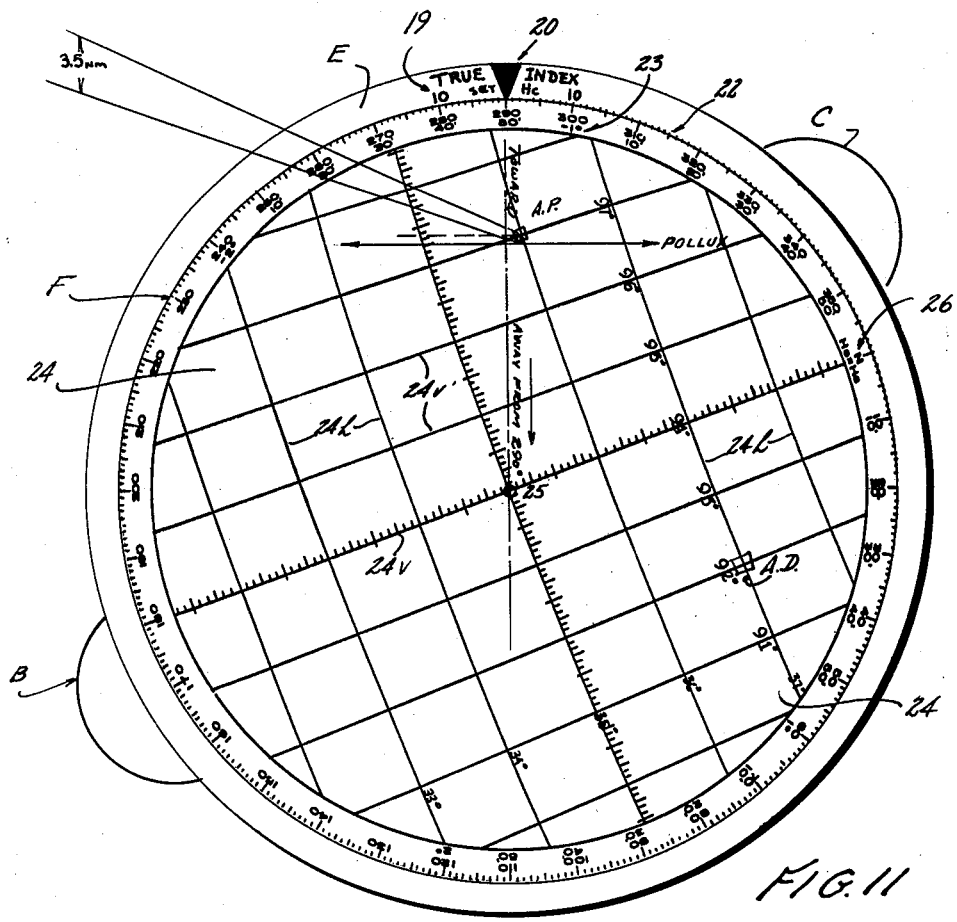
FIGURE 11 is also a view similar to FIGURE 10, showing a further plotting development of the three star fix solution.
Figure 12:
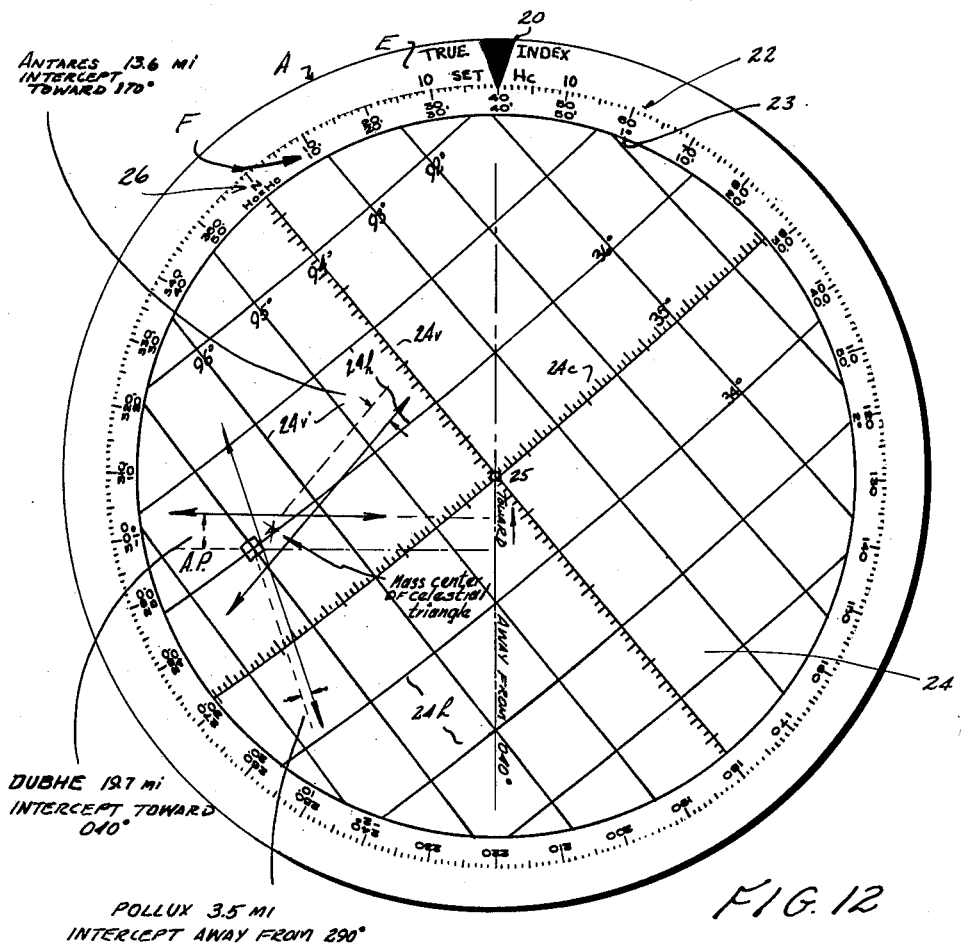
FIGURES 12, 13 and 14 are similar views, for explaining a further development of the celestial fix solution, and plotting thereof.
Figure 13:
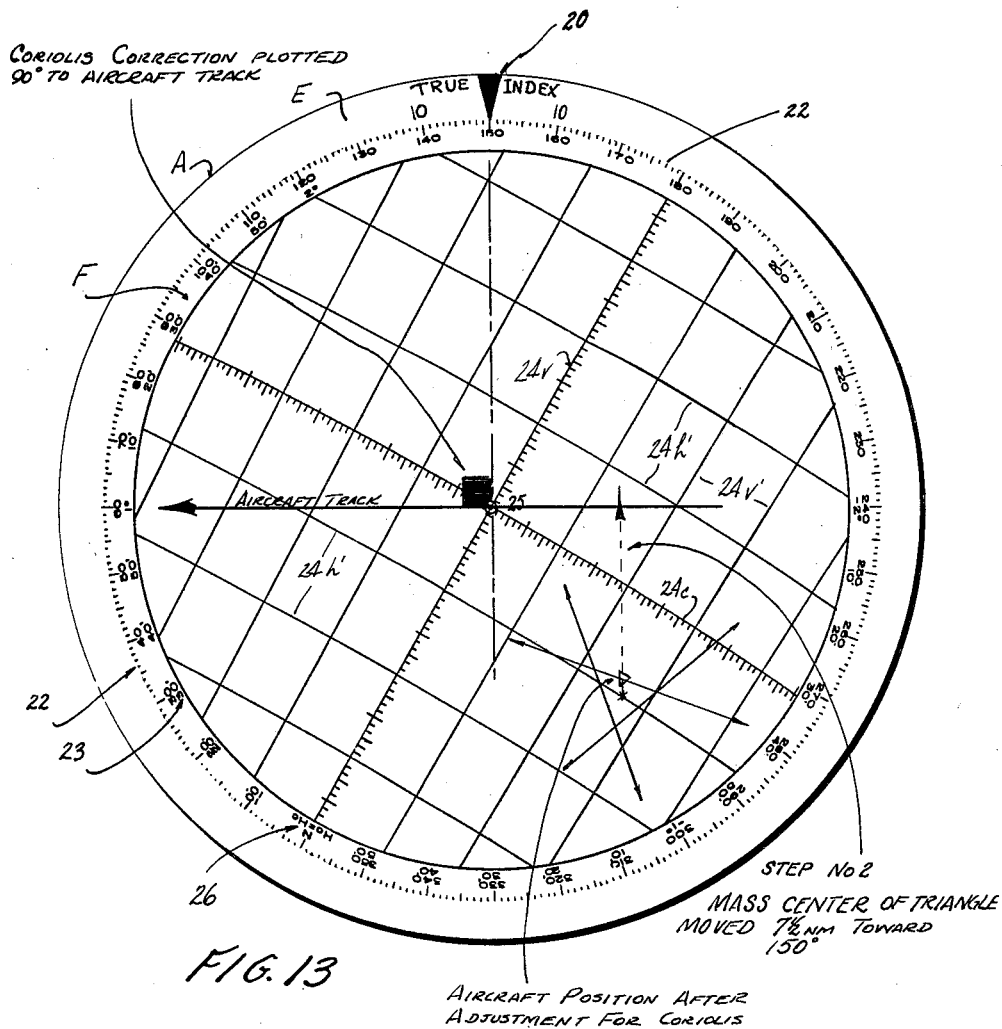
Figure 14:
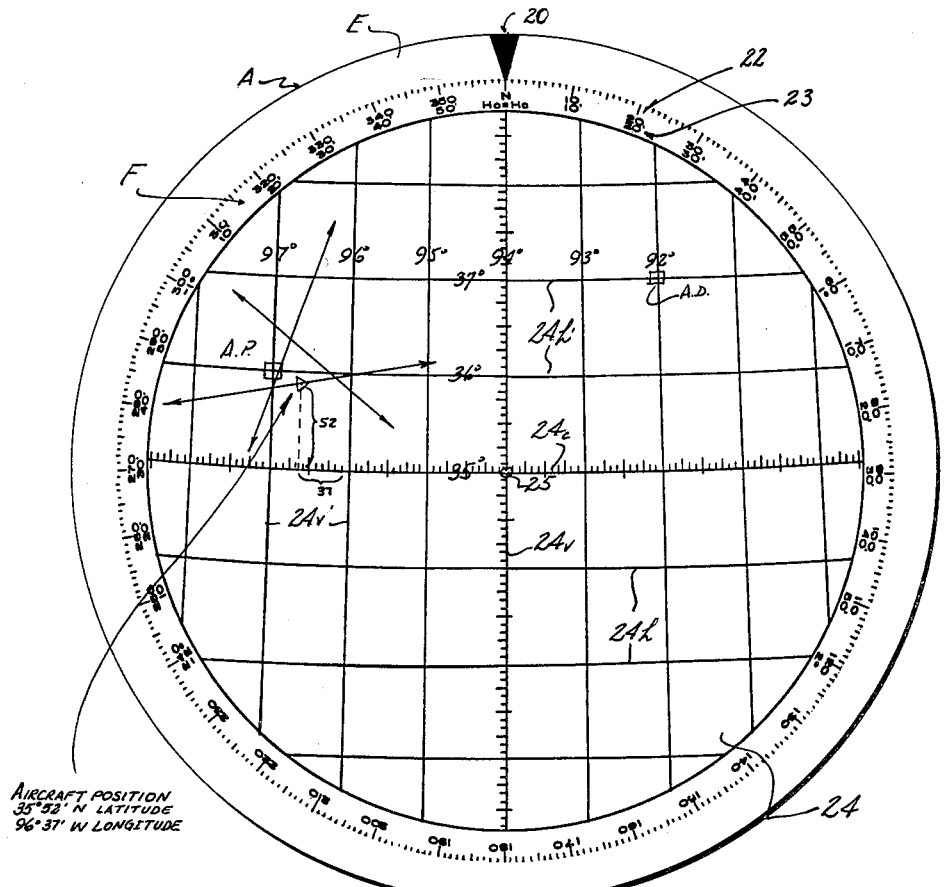

(10) Plot the fix by using the plotter side of the device:

(a) With north at the top select a meridian 24V on the left or west side of the plotting surface (since the aircraft is proceeding in an easterly direction) and label this meridian 97° west longitude. At the same time lay-off meridian of destination, (FIG. 11, No. 1);

(b) Plot the aircraft assumed position AP of 36° N. and 97° W., as shown in FIG. 10;

(c) Plot the destination AD at 37° N. and 92° W. (five degrees to the right of the assumed position), FIG. 10;

(d) Rotate plotting surface 24 so that azimuth of 290° (Pollux) is at top index 20 of plotting surface 24, (FIG. 11);

(e) Estimate a distance of 3.5 miles with relation to the base graticule 21a and measure down or away from the assumed position AP this amount. At this point draw a horizontal line parallel to the horizontal graticule lines 27h, (FIG. 11) the line should be several inches in length;

(f) The procedure is repeated for each of the other two stars by setting their true azimuth values against the True Index 20 and then drawing up from the assumed position AP or towards the azimuth of 170° for Antares and towards 040° for Dubhe distances of 13.6 miles and 19.7 miles, respectively. The lines parallel to the horizontal graticule 27h are made sufficiently long that they will intersect to form a triangle, (FIG. 12);

(g) The center of the triangle is then moved by the amount of the coriolis correction and this adjusted position labelled fix position. The adjustment is made by mentally adding 90° to aircraft track, 90+060=150, and the new direction (150°) placed under the index 20. The center of the triangle is then moved towards 150° a distance of 7½ miles, the amount of the coriolis correction, (FIG. 13); and (h) The final step is to read off the aircraft position with reference to the latitude and longitude lines 24h and 24v' on the plotting surface. This is done by first rotating the surface so that north (or 360) is under the True Index 20. Inspection of the adjusted position will show the aircraft to be at 35°52' North Latitude and 96°37' West Longitude, (FIG. 14).

Figure 15:
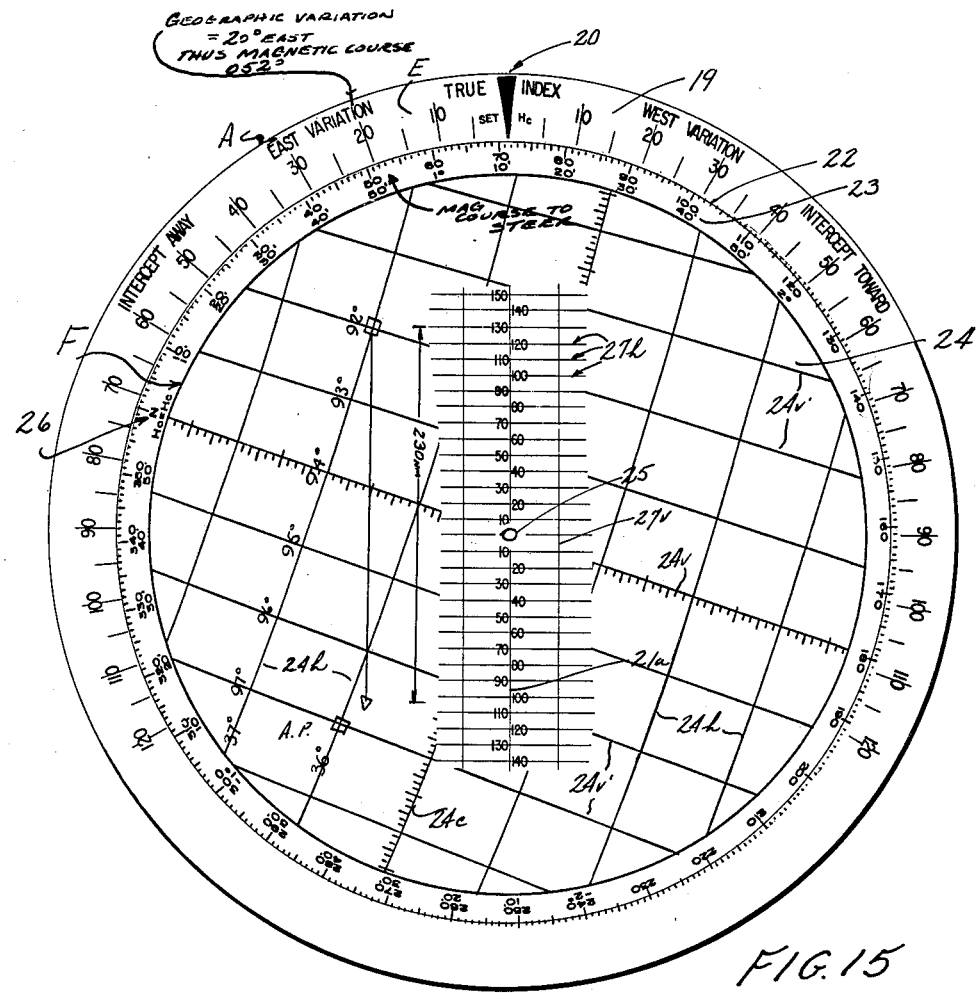
FIGURE 15 is also a similar view, part of the plotting disk being broken away to show the grid portion 21 on the under disk E more clearly and its employment to determine distance between the AP and destination (or between succeeding fixes)

To determine the course and distance to destination rotate the plotting surface 24 until the fix just plotted and destination (plotted in a previous step) are directly in line with one another along or parallel to one of the vertical graticules 27v. Read True Course to fly under the True Index 20 in this case 072°. Read distance to fly by counting the intervening spaces on the graticule 24 between the two points, in this case, a distance of 230 miles, (FIG. 15).

In the event that Magnetic Course is desired rather than True Course the navigator looks opposite VARIATION on the outer scale 19 to find Magnetic Course on the inner scale 22. For example, if the average variation between the fix point and destination were 20° East, the navigator would note that his Magnetic Course is 052° rather than 072° (FIG. 15).

There will be cases wherein the navigator experiences wander of aircraft heading during the celestial observation. A correction may be determined from the computer by multiplying the degrees of heading change times the factor taken from the wander correction scale 15. (The same scale 15 is used for wander correction determination as is used for coriolis determination (FIG. 1).) The navigator enters this scale with the argument Zn-Tr instead of latitude. The SET GS index 18a must be set to the correct ground speed. For example, at a ground speed of 500 knots the wander correction factor for one degree of heading change for the star Antares (Zn-Tr=070°) is 12½ miles (or minutes of arc). The sign of the correction is determined from the rule "sign is plus if turn is toward the star and is minus if turn is away from star";

(1) For the star Pollux (Zn-Tr=50°) the factor in the problem described in this paper is 10 minutes of arc;

(2) For the star Dubhe (Zn-Tr=20°) the factor is 4.3 minutes of arc.

There will be cases wherein the navigator is aware of a change of aircraft velocity either due to a gust of wind or to a change of true airspeed. In this event he may correct for the error thus imposed by applying an Airspeed Change correction factor determined by reference to the Motion of the Observer scale 13. The ground speed must first be set to either 90 or 900 knots. With ground speed set at 900 knots the correction factor will accommodate a change of 10 knots of speed, set at 90 knots it will correct for a change of 1 knot. Entering argument is again Zn-Tr since we are interested in relative azimuth of the body with respect to the change experiences. For example, the ground speed change factor for DUBHE is 14 minutes of arc for a change of 10 knots (FIG. 16, No. 1). The sign of the correction is determined from the rule "sign is plus if velocity change is toward star, and is minus if change is away from star." That is, when sighting Dubhe, which is ahead of the aircraft in this problem, if the change should be a loss of speed the change is in a vector direction away from the star thus the sign would be minus:

(1) For Pollux the factor in this problem is 9.6 minutes of arc for a 10 knot change;

(2) For Antares the factor is 5 minutes of arc for a 10 knot change.

The innermost azimuth ring of the top "D" disk of the computer (FIG. 17, No. 4) is used to determine sextant relative bearing, a direction used to locate the desired star during the observation. The SET TRACK INDEX 1 is set to aircraft true heading and the SRB 4 located by reading opposite star True Azimuth 2. For example, with an aircraft True Heading of 065°, as seen in FIG. 17, the SRB of Pollux would be 135° (FIG. 17), that of Antares would be 255° and that of Dubhe 025°.

During the observation of the star the navigator may verify the accuracy of his True Heading by utilizing the Sextant Relative Bearing Scale 4 in reverse. Once the star is identified the sextant relative bearing is precisely established in the bubble chamber of the sextant by relating it to the azimuth ring and lubber line which appear in the field of view in the Sextant. The SRB 4 thus determined is set against star true azimuth 2 on the computer and aircraft True Heading on 2 read out opposite the SET TRACK INDEX 1 (FIG. 17).

In the event that the navigator wishes to locate or to use the star Polaris, the north star, he may do so in the following manner:

(1) Set the SET TRACK INDEX 1 to the tabulated Local Hour Angle of Aries using the outermost azimuth ring 2 of the computer as the expression of Hour Angle (FIG. 18);

(2) Opposite the Q FACTOR INDEX 7 read the correction to apply to computed altitude of the star Polaris. For example, with SET TRACK INDEX 1 oriented to an LHA Aries value of 55° read a Q factor of +50 minutes of arc in the little window 6a opposite the Q INDEX 7 (FIG. 18);

(3) At the same time the above relationship is established the navigator may determine the amount of the correction to apply to 360° to find True Azimuth of Polaris. In this example, with the aircraft at 36° North latitude, LHA Aries 55°, the correction found opposite the Latitude Index 16 in the center window 16a of the computer is −.5° which must be subtracted from 360. The corrected True Azimuth of Polaris is therefore 359.5°.

The computation of the intercept may be facilitated slightly by using the subtraction scale on the back of the computer in the following manner (FIG. 19);

Set computed altitude DUBHE under the True Index 20 of the plotter using the Ho=Hc point as the base point of the value. Thus if Hc of Dubhe is 40°30' the first 30 clockwise from Ho=Hc index is set under the True Index. If the observed altitude is 40°50' the navigator locates the point 50 on the arc clockwise from the base point (Ho=Hc Index 20) and reads out to the outer scale 19 to find Intercept 20 Toward (FIG. 19). Had the observed altitude been 39°20' he would read counterclockwise from the base point to the first 20 below the base point, read out to the outer scale and determine Intercept 70 away (FIG. 19).

Development of the delta latitude and delta longitude to set into automatic navigation systems, that is the difference in latitude and longitude between aircraft position as determined from the celestial fix plotted on the Plotter and the Present Position being carried by the computers is found by annotating on the plotting surface 21 the coordinates at the time of the fix and determining the number of minutes of latitude and longitude between the two positions. This information is then taken from the plotter and used to adjust the electronic computer (FIG. 20).

Development of the celestial position of the aircraft as a relative position: In this case the navigator uses the center of the plotter, or grommet 25, as the aircraft assumed position and then plots the lines of position of the stars with reference to this point. The completed fix is then read as a range and bearing from the grommet 25 by extending a vector from the grommet through the fix and rotating the plotter disk "F" to bring this vector over the vertical center line. Direction is read out under the TRUE INDEX and distance measured by counting the miles between grommet and fix. This position is then transposed to a standard navigation chart to make it a useful position. For example, assume the intercepts and azimuths to be 10 toward 360°, 20 away from 120°, and 10 toward 240°. Using a scale of 1 division −1 mile plot the fix and note the range to be 20 miles and the bearing to be 300°, (FIG. 21).

To determine track made good and distance run between fixes the navigator substitutes a plot of a second celestial fix for the destination described above. He then rotates the plotter so that fix number two will be directly above fix number one along or parallel to one of the vertical graticules 24v. Using the fix position of the original problem, par. c(10) above, and assuming that the destination is the second fix, note that the track made good is 072° and the distance run is 230 miles, (from minus 105 to plus 125), (FIG. 15).

SUMMARY

The Celestial Computer and Plotter is believed to be the first hand-held computer available to aircraft navigators capable of presenting all the mathematical corrections necessary to the accurate determination of aircraft position by celestial means.

It is the only present source of information relative to speeds above 700 knots.

It is the only such device presenting the data about all the celestial bodies simultaneously and at the same time considers so many factors.

It is the only such device offering a map like plotting surface (which eleminates the need for draftsman's dividers and plotter) in conjunction with the computer.

The mechanical relationship of the scales of the computer eliminates the need for involved mathematical solutions and this reduces the training time required to teach student navigators how to do celestial fixing.

It is believed to be the only available device in the hand-held computer field which offers the accuracy of information available hereon.

Proper use of the computer will significantly reduce the man hours of labor involved in jet aircraft mission planning requirements since a complete solution can be achieved in something like 3 minutes. This facility largely eliminates the need for detailed ground precomputed data.

All of the following data are available to the navigator as the result of setting three indexes on the computer face:

*a.* Motion of the star
*b.* Relative azimuth of the star
*c.* Motion of the star with respect to the aircraft
*d.* Sextant relative azimuth
*e.* Coriolis acceleration correction factor
*f.* Heading wander acceleration factor.

Two additional settings make available:

*a.* The Q factor of Polaris
*b.* The azimuth correction factor of Polaris
*c.* Airspeed and/or ground speed change acceleration factor.

We claim:

1. A multiple star fix celestial computer having a plurality of superimposed rotatably adjustable circular concentric disks comprising a main disk having a front face and a rear face, said front face having an outer "true azimuth" scale graduated in degrees extending clockwise from 0° to 360°, an inner "Polaris azimuth" correction scale for determining Polaris corrections relative to the north pole for variations in true azimuth and aircraft altitude, and an intermediate "Polaris Q factor" logarithmic scale for determining Polaris corrections for variations in azimuth, a second superimposed disk having an outer logarithmic "aircraft latitude" scale, and an inner corelated logarthmic "motion of the body" correction scale thereon and displaying the scales of said main disk therethrough out of register with said scales on said main disk, a third superimposed disk having an outer logarithmic "aircraft ground speed" scale, an inner logarithmic corelated "coriolis correction" scale and an intermediate corelated logarithmic "motion of the observer" correction scale thereon, and displaying the aforesaid scales on said main and second disks therethrough out of register with the scales on said third disk, a fourth superimposed disk having 0° "relative star azimuth" set track index pointer for cooperative registration with said true azimuth scale on said main disk graduated in degrees clockwise and counterclockwise from said set track index from 0° to 90° at opposite sides and said 90° at opposite sides, clockwise and counterclockwise to 0° opposite said set track index, having a dark segment from 90° to 90° at opposite sides of said 0° point which is opposite said set track index said fourth disk having a radial window in radial alignment with said set track index for display of predetermined Polaris Azimuth correction scale indicia and a "ZN Latitude" selection scale adjacent said last window for selecting predetermined Polaris Azimuth correction scale indicia displayed on the last mentioned window, said fourth disk having a "set latitude" indicating window for displaying said aircraft latitude scale thereon and a semicircular "motion of the body" display window for said motion of the body correction scale, a logarithmic "motion of the body" determining scale along one side of said last window graduated clockwise substantially from 0° to 90° and then reversely graduated from said 90° to substantially 180° and a second corelated logarithmic scale on the opposite side of the last mentioned window having a dark field and graduated substantially from said 180° clockwise to 270° at the other end and then reversely graduated from said 270° substantially back to 360° at the other end, said fourth disk having a "set ground speed" display window for said aircraft ground speed scale on said third disk for setting said third disk relative to said fourth disk for indicated ground speeds, said fourth disk having an arcuate "coriolis and wander" determining window for said coriolis correction scale on said third disk and a corelated "coriolis and wander" determining scale adjacent one side of said window logarithmically calibrated in a clockwise direction substantially from 0° at one end to 90° at the other end for cooperative registration with the third disk coriolis correction scale, relative to ground speed on said aircraft ground speed scale, said fourth disk having a substantially semicircular correction for "motion of the observer" display window for said motion of the observer correction scale on said third disk and a corelated logarithmic scale adjacent the last mentioned window calibrated clockwise from 0° at one end to substantially 90° at the other end for cooperative registration with said motion of the observer correction scale on said third disk for determining relative motion of the body corrections for variations in ground speeds displayed in said set ground speed indicating window.

2. A multiple star fix celestial computer of the circular disk type comprising main, second, third and fourth relatively rotatably adjustable concentric disks, said main disk having a front face having a peripheral 360° "true azimuth" scale reading clockwise from zero degrees, an inner concentric circular "Polaris azimuth" correction scale graduated in opposite direction in plus and minus degrees in predetermined relation the zero —360° location on said true azimuth scale, comprising a plurality of radial columns of indicia, each column disposed in radial alignment with a predetermined degree of indicia on said peripheral true azimuth scale for determining variations in azimuth for Polaris for variations in azimuth and altitude, and an intermediate concentric circular "Polaris Q" factor scale disposed in radially spaced relation between said inner Polaris azimuth correction scale and said peripheral true azimuth scale, having opposite 0° points and graduated in plus and minus degrees in opposite directions therefrom for determining variations in LHA Aries relative to the position of Polaris to the north pole of the earth, said second disk being substantially transparent of smaller diameter than said true azimuth scale on said main disk to expose said Polaris azimuth correction and said Polaris Q factor scales therethrough, said second disk having an inner concentric circular "relative motion of the body" correction scale and an outwardly spaced circular aircraft latitude indicating scale, said scales on said second disk disposed in radially spaced relation to each other at distances intermediate said Polaris Q factor scale and said true azimuth scale on said main disk, for determining relative motion of the body due to earth rotation for variations in latitude for a predetermined time period, said aircraft latitude scale being calibrated counterclockwise from 0° to 89.5°, and said motion of the body correction scale calibrated in predetermined relation to said latitude scale from 0° to 15° in a clockwise direction to a point 20° counterclockwise from said 0° point on said aircraft latitude scale, said third disk being substantially transparent having a diameter substantially similar to the diameter of said second disk, having three circular scales thereon in radially different concentric locations to the aforesaid concentric scales on said main and second disks to be exposed through said third disk, said scales on said third disk comprising an inner "Coriolis correction" scale denoting Coriolis corrections for variations in aircraft ground speed for said predetermined time interval, reading clockwise from .1° to 55°, an intermediate "motion of the observer" scale calibrated clockwise from .1° at a point 18° counterclockwise from .1° on said Coriolis correction scale, for determining motion of the observer for predetermined ground speeds for said predetermined time interval, and an outer corelated "ground speed of the aircraft" indicating scale graduated in predetermined ground speeds in nautical miles in a clockwise direction relative to the other two scales of said third disk for indicating the ground speeds of the aircraft during the aforesaid time interval starting at a point 70° counterclockwise from a point radially opposite said .1° point on said motion of said observer correction scale, said fourth disk being substantially opaque, having a diameter less than said true azimuth scale on said main disk, said fourth disk having an outer peripheral "star relative azimuth" scale divided into four 90° quadrants with 0° indicia at opposite sides, and graduated in opposite directions in degrees from said 0° points to said 90°, having a radial "set track index" pointer at one of said 0° indicia for registration with said true azimuth scale on said main disk, said opaque fourth disk having an elongated radial window in alignment with said set track index pointer for selectively exposing single radial columns of said Polaris azimuth correction scale on said main disk corresponding in position to said degrees on said true azimuth scale, opposite said track index pointer, an "aircraft altitude indicating" scale adjacent the side of said window for selecting predetermined concentric rings of said Polaris azimuth correction scale on said main disk for predetermined aircraft altitudes, said fourth disk having a "Polaris Q factor" exposure window and pointer therefor in radial alignment with said set track index pointer for exposing therethrough predetermined Polaris Q factor indicia on said main disk for indicating predetermined Q factor corrections on said Polaris Q factor correction scale for variations in true azimuth indicated on said main disk relative to the selected star relative azimuth on said fourth disk, said fourth disk having a "set latitude" window and index therefore disposed 110° clockwise from said set track index for disclosing said aircraft latitude indicia on said second disk therethrough, and a substantially semicircular concentric "motion of the body" correction scale display window for displaying said motion of the body correction scale indicia therethrough, said window extending substantially 90° each side of said set track index pointer on said star relative azimuth scale, and having a corelated "Star True Azimuth (Zn)" scale calibrated clockwise from .5° substantially adjacent 90° on one side of said star relative azimuth scale to substantially 90° on the opposite side of said star relative azimuth scale then back along the last meridian window in the opposite direction counterclockwise to 179.5° opposite the aforesaid .05° point, for cooperative registration with said motion of the body correction scale on said second disk, said fourth disk having a "set ground speed" window for disclosing therethrough a portion of said aircraft ground speed indication scale on said third disk, having a pointer therefor disposed 110° counterclockwise from said set track index pointer, said fourth disk having a semicircular "motion of the observer" scale display, window extending at least 90° in opposite directions from said 0° point opposite said set track index pointer for disclosing therethrough a portion of said motion of the observer correction scale, said semicircular motion of the observer display window having a corelated scale calibrated from 0° to 89.5° extending counterclockwise between the opposite 90° points on said star relative azimuth scale on said fourth disk, said fourth disk having a concentric "Coriolis and wander scale" display window for displaying said Coriolis correction scale on said third disk therethrough, and a "Coriolis latitude scale" adjacent the last mentioned window extending in a counterclockwise direction from substantially 80° opposite 0° in said motion of the observer indicia, adjacent the motion of the observer window substantially to 1° opposite 8.9° on the motion of the observer indicia display window scale, said fourth disk having a "set ground speed" display window for displaying said ground speed scale on said third disk therethrough and a "set ground speed" index pointer therefor disposed 110° counterclockwise from said set track index pointer for indicating selected ground speed on said third disk ground speed scale.

3. A celestial multiple star fix computer comprising a main circular disk having a front face and a rear face, said front face having a peripheral "true azimuth" scale thereon calibrated in degrees from 0° to 360°, an inner concentric "Polaris azimuth correction scale" thereon calibrated in predetermined relation to said true azimuth scale in a plurality of radial columns of indicia, each column disposed in radial alignment with a predetermined degree indicia on said true azimuth scale for determining variations in azimuth for Polaris for variations in altitude, a circular concentric "Polaris Q factor" indicia scale disposed on said main disk in radially spaced concentric predetermined relations to said "Polaris azimuth correction" scale for indicating predetermined variations in LHA Aries relative to the position of Polaris to the north pole, a second substantially transparent disk disposed in rotatably adjustable superimposed concentric relation on said main disk to expose said Polaris azimuth correction scale and said Polaris Q factor scale therethrough, and having an inner concentric circular "motion of the body" correction scale, and an outwardly spaced circular concentric "aircraft latitude" indicating scale disposed in predetermined relation to said motion of the body correction scale, said scales on said second disk disposed in radially spaced relation to each other at a distance intermediate the radial distance of said Polaris Q factor scale and said true azimuth scale on said main disk, for indicating relative motion of the body due to earth rotation for variations in latitude for a predetermined time period, a substantially transparent third disk concentrically mounted on said main and second disks for independent rotative adjustment, having three circular concentric scales thereon disposed in radially different locations from the aforesaid concentric scales on said main and second disks said third disk scales comprising an inner "Coriolis correction" scale for denoting Coriolis corrections for variations in aircraft ground speed for said predetermined time interval, an intermediate "motion of the observer" correction scale for determining motion of the observer for predetermined ground speeds for said time interval, and an outer corelated "ground speed of the aircraft" indicating scale for indicating predetermined ground speeds during said predetermined time interval, and a fourth or top substantially opaque circular disk disposed in superimposed concentric rotatably adjustable relation on said main, second and third disks, said fourth disk having an outer concentric "star relative azimuth" indicia scale of 360° divided into four 90° quadrants having 0° indicia on opposite sides and graduates in opposite directions therefrom to 90°, having a "set track" index pointer at one of said 0° points, said star relative azimuth scale and said set track index pointer disposed for radial registration with said true azimuth scale on said main disk, said top disk having a radial window in alignment with said set track index pointer for exposing a single radial column of said Polaris azimuth correction scale on said main disk therethrough, and an aircraft altitude indicating scale adjacent said radial window for indicating predetermined Polaris scale indicia in said radial columns for predetermined aircraft altitudes, said top disk having a "Polaris Q factor" exposure window disposed in radial alignment with said set track index pointed for exposing predetermined Polaris Q factor indicia on said Polaris Q factor scale therethrough, and a Polaris Q factor index pointer adjacent the last mentioned window in alignment with said set track index pointer for indicating predetermined Polaris Q factor corrections on said Q factor scale for variations in true azimuth indicated on said main disk relative to said star relative azimuth on said fourth disk, said fourth disk having a "set latitude" window and index pointer disposed 110° clockwise from said set track index pointer for exposing therethrough a selected aircraft latitude indicia on said aircraft latitude scale on said second disk, said fourth disk having a concentric arcuate "motion of the body" determining window extending substantially 90° each way, above said Polaris Q factor window, from said set track index pointer for exposing therethrough predetermined correlated indicia on said motion of the body correction scale of said second disk for variations in latitude, and a correlated arcuate scale adjacent each side of the last window calibrated end to end for variations in degrees, one scale calibrated from .5° to 90° in one direction and then 90° to 179.5° in the opposite direction and the other calibrated from 180° to 270° in one direction then 270° to 359.5° in the opposite direction, said fourth disk having an inner semicircular concentric "coriolis and wander" correction display window therein for exposing therethrough a portion of said coriolis correction scale of said third disk for determining coriolis and wander corrections for variations in ground speed, coriolis and wander correction display window extending from a point substantially in radial alignment with the 90°, counterclockwise of said set track index pointer on said star relative azimuth scale for substantially 165°, and a correlated coriolis and wander correction determining scale adjacent one edge of the last mentioned window for registration with said coriolis correction scale on said third disk, said fourth disk having a correction for "motion of the observer" display window concentrically disposed for exposing a portion of said motion of the observer correction scale on the third disk therethrough, the last mentioned window extending concentrically substantially 180° between the opposite 90° indicia points on said star relative azimuth scale, a correlated correction for "motion of the observer" scale adjacent one side of the last mentioned window calibrated in degrees for determining motion of the observer on the motion of the observer scale on the third disk for predetermined different ground speeds for said predetermined time period, said fourth disk having a "set ground speed" display window and pointer disposed 110° counterclockwise from said set track index pointer for display and registration therewith of selected ground speeds on said aircraft ground speed scale on said third disk.

4. A celestial multiple star fix computer comprising a main disk having a front face and a rear face, said front face having a peripheral "true azimuth" scale calibrated 360° from 0°, an inner concentric "Polaris azimuth" correction scale thereon calibrated in predetermined relation to the 0°, 360° position on said true azimuth in a plurality of radial columns of said Polaris azimuth correction indicia forming concentric rings of said indicia for different altitudes, each column disposed in radial alignment with a predetermined degree of indicia on said peripheral true azimuth scale, for determining variations in azimuth for Polaris for variations in altitude, said main disk having a circular concentric "Polaris Q factor" indicia scale disposed in radially spaced concentric relation to said Polaris azimuth correction scale comprising a scale having degree indicia disposed in predetermined relation to said Polaris azimuth scale indicia for indicating predetermined variations in LHA Aries relative to the position of Polaris to the north pole, a second substantially transparent disk of smaller diameter than said main disk, disposed in rotatably adjustable superimposed concentric relation on said main disk to expose said Polars azimuth and Polaris Q factor correction scale indicia therethrough, having an inner concentric "motion of the body" correction scale and an outwardly spaced concentric aircraft latitude indicating scale, said scales of said second disk disposed in radially spaced relation to each other at a distance intermediate the radial distance of said true azimuth and said Polaris Q factor scales on said main disk, for determining relative motion of the body due to earth rotation for variations in latitude for a predetermined time interval, a third substantially transparent disk rotatably adjustable on said main and second disks in concentric relation, having three concentric indicia scales thereon located in different spaced concentric locations from the aforesaid concentric scales on said main and second disks, said third disk scales comprising an inner "Coriolis correction" scale denoting Coriolis corrections for variations in ground speed of the aircraft for said predetermined time interval, an intermediate "motion of the observer" correction scale for determining motion of the observer for said predetermined ground speeds for said predetermined time interval, and an outer correlated ground speed of the aircraft indicating scale for indicating the ground speeds of the aircraft during said predetermined time interval relative to the aforesaid indicia on the other two scales on said third disk, an opaque fourth or top disk adjustable in concentric superimposed relation on said third disk having a 360° peripheral "star relative azimuth" indicia scale divided into four 90° quadrants having opposite 0° points, graduated 90° in opposite directions from said 0° points, and a radial "set track" index pointer at one of said 0° indicia for registration with said true azimuth scale indicia on said main disk, said top disk having a window in alignment with said set track index for exposing a radial column of said Polaris azimuth correction scale therethrough, and an aircraft altitude scale adjacent said window for indicating predetermined indicia in said columns for selected aircraft altitudes on said altitude scale, said fourth disk having a "Polaris Q factor" exposure window in predetermined relation to said set track index pointer for exposing Polaris Q factor determining indicia on said Polaris Q factor scale therethrough, and a "Polaris Q factor" index pointer adjacent the last mentioned window for indicating predetermined Polaris Q factor indicia for variations in true azimuth on said main disk relative to star relative azimuth on said fourth disk, said fourth disk having a "set latitude" window and index for exposing a selected aircraft latitude indicator on said aircraft latitude scale on said second disk, said fourth disk having a "motion of the body" indicating window for displaying therethrough said motion of the body correction scale on said second disk, a "motion of the body" determining scale adjacent the last mentioned window for cooperative registration with said motion of the body correction scale on said second disk, for indicating variations for the motion of the body for variations in latitude disclosed through said set latitude window, said fourth disk having a "Coriolis and wander" indicia display window for exposing therethrough a predetermined position of said Coriolis correction scale on said third disk for predetermined variations in coriolis and wander relative to ground speed indications on said aircraft ground speed scale on said third disk, a "Coriolis and wander" correction scale adjacent said last mentioned window having adjacent correlated latitude indicia for said coriolis and wander correction scale on said third disk, said fourth disk having a "motion of the observer"

display window therein for display of said motion of the observer correction scale therethrough, said last window having an adjacent correlated "motion of the observer" determining scale for registration with said motion of the observer correction scale on said third disk, said fourth disk having a "set ground speed" indicating window for display of said aircraft ground speed scale of said third disk therethrough and a "Set GS" pointer adjacent said window for selecting predetermined ground speed indicia on said third disk correlated to predetermined data on said coriolis correction and motion of the observer correction scales.

5. A celestial logarithmic multiple star fix computer comprising a main disk having a front face, and a rear face, said front face having a peripheral "true azimuth" scale thereon calibrated in degrees from zero to 360 degrees, an inner concentric "Polaris azimuth" correction scale thereon calibrated in predetermined relation to the zero–360 degree position on said true azimuth scale in a plurality of radial columns of indicia forming concentric rings, each column disposed in radial alignment with a predetermined degree of indicia on said peripheral true azimuth scale for determining variations in azimuth for Polaris, for variations in altitude, on a circular concentril "Polaris Q factor" indicia scale disposed in radially spaced concentric relation to said Polaris azimuth correction scale comprising a logarithmic scale having indicia disposed in predetermined relation to said Polaris azimuth scale indicia for determining predetermined variations in LHA Aries relative to the position of Polaris to the north pole, a second substantially transparent disk smaller in diameter than said main disk, disposed in rotatably adjustable superimposed concentric relation on said main disk to expose said Polaris azimuth and Polaris Q factor scales therethrough, having an inner concentric logarithmic circular "motion of the body" correction scale and an outwardly spaced circular concentric logarithmic "aircraft latitude" indicating scale, said scales of said second disk disposed in radially spaced relation to each other at a distance intermediate the radial distance of said Polaris Q factor scale and said True Azimuth scale on said main disk for determining relative motion of the body due to earth rotation for variations in latitude for a predetermined time interval, a third superimposed substantially transparent disk, substantially the same diameter as said second disk, disposed in rotatably adjustable concentric relation on said main and second disks, having three arcuate logarithmic scales thereon located in radially spaced different concentric locations to the aforesaid concentric scales on said main and second disks, said third disk scales comprising an inner logarithmic "Coriolis correction" scale denoting coriolis corrections for variations in ground speed of the aircraft for said predetermined time interval, an intermediate logarithmic "motion of the observer" correction scale for determining motion of the observer for predetermined ground speeds for said predetermined time interval, and an outer correlated logarithmic "ground speed of the aircraft" indicating scale for indicating predetermined ground speeds relative to the other two scales on said third disk, an opaque fourth or top disk of substantially similar diameter as the second and third disks, disposed in concentric rotatably adjustable relation to the aforesaid disks, having a peripheral "star relative azimuth" indicia degree scale having four 90° quadrants divided with 0° indicia thereon at opposite sides and graduated in opposite directions in degrees therefrom to 90°, and a "set track" index pointer at one of said 0° indicia for registration with the True Azimuth Scale on the main disk, said top disk having a radial window in alignment with said set track index pointer for exposing a single radial column of said Polaris azimuth correction scale on said main disk, and having a logarithmic "aircraft altitude" indicating scale adjacent one side of said radial window for indicating predetermined concentric rings of said Polaris azimuth correction scale for predetermined aircraft altitudes, said fourth disk having a "Polaris Q factor" exposure window in predetermined relation to said set track index for exposing predetermined Polaris Q factor indicia on said Polaris Q factor scale therethrough and a Polaris Q factor index pointer adjacent the last mentioned window in alignment with said set track index for indicating predetermined Polaris Q factor corrections on said Polaris Q factor scale for variations in true azimuth indicated on said main disk relative to Star 0° azimuth, said fourth disk having a "set latitude" window and index for exposing therethrough a selected aircraft latitude indication on said aircraft latitude scale on said second disk, said fourth disk having a concentric arcuate window extending substantially 90° each way from said zero and set track index for disclosing therethrough predetermined correlated indicia on said motion of the body correction scale on said second disk, arcuate logarithmic scales adjacent both sides of said last window having a logarithmic indicia scales graduated for degrees for registration with said motion of the body correction scale on said second disk, for indicating variations for motion of the body for variations in latitude, said fourth disk having a semicircular concentric coriolis and wander correction window therein disposed to expose a predetermined portion of said coriolis correction scale of said third disk, for variations in ground speed indicia indicated in said ground speed wndow opposite its index, said last window having a logarithmic "coriolis and wander" correction scale adjacent the edge thereof graduated for degrees from 1° to substantially 90° for latitude corrections for coriolis and wander, said fourth disk having a second semicircular window therein for exposure therethrough of said motion of the observer correction scale on said third disk, and said last window having a correlated logarithmic scale for registration with said logarithmic motion of the observer correction scale on said third disk and graduated substantially from 0° to 89.5°, for determining motion of the observer corresponding to ground speed during said predetermined time period.

References Cited in the file of this patent

UNITED STATES PATENTS

| | | |
|---|---|---|
| 2,433,984 | De Vries | Jan. 6, 1948 |
| 2,834,123 | Knight | May 13, 1958 |